United States Patent [19]
Konishi et al.

[11] Patent Number: 5,285,332
[45] Date of Patent: Feb. 8, 1994

[54] TAPE LOADING DEVICE WITH REDUCED TAPE RUNNING LOAD AND SIMPLIFIED CONSTRUCTION FOR MAGNETIC RECORDING AND/OR REPRODUCING APPARATUS

[75] Inventors: Akio Konishi, Hirakata; Hideaki Yoshio, Moriguchi; Hiroshi Kurumatani, Osaka; Yoshiyuki Saito, Kadoma, all of Japan

[73] Assignee: Matsushita Electric Industrial Co., Ltd., Osaka, Japan

[21] Appl. No.: 763,602

[22] Filed: Sep. 23, 1991

[30] Foreign Application Priority Data

Sep. 28, 1990 [JP] Japan ................................ 02-260794
Sep. 28, 1990 [JP] Japan ................................ 02-260795
Sep. 28, 1990 [JP] Japan ................................ 02-260796

[51] Int. Cl.$^5$ ............................................. G11B 5/027
[52] U.S. Cl. ................................................... 360/85
[58] Field of Search ..................................... 360/85, 95

[56] References Cited

U.S. PATENT DOCUMENTS

| | | | |
|---|---|---|---|
| 3,784,761 | 1/1974 | Moritan | 360/85 |
| 3,818,503 | 6/1974 | Hosono | 360/85 |
| 4,012,788 | 3/1977 | Blanding | . |
| 4,517,613 | 5/1985 | Shibaike | 360/85 |
| 4,520,411 | 5/1985 | Ohshima | 360/85 |
| 4,652,947 | 3/1987 | Oka et al. | . |
| 4,692,823 | 9/1987 | Gwon | 360/85 |
| 4,703,138 | 10/1987 | Suzuki | . |
| 4,807,077 | 2/1989 | Zaitsu | 360/85 |
| 4,907,110 | 3/1990 | Ando | 360/85 |

FOREIGN PATENT DOCUMENTS

| | | |
|---|---|---|
| 0068746 | 1/1983 | European Pat. Off. . |
| 0291340 | 11/1988 | European Pat. Off. . |
| 61-261845 | 11/1986 | Japan . |
| 3-127372 | 5/1991 | Japan . |
| 2178888 | 2/1987 | United Kingdom . |
| 2205434 | 12/1988 | United Kingdom . |

OTHER PUBLICATIONS

Patent Abstracts of Japan, vol. 13, No. 203 (P-870) 15 May 1989 & JP-A-10 21 740 (Sanyo Electric Co. Ltd.) 25 Jan. 1989.
Patent Abstracts of Japan, vol. 12, No. 284 (P-740) 4 Aug. 1988 & JP-A-63 061 445 (Matsushita) 17 Mar. 1988.
Patent Abstracts of Japan, vol. 7, No. 266 (P-239) 26 Nov. 1983 & JP-A-58 147 845 (Matsushita) 2 Sep. 1983.
Patent Abstract of Japan, vol. 4, No. 43 (P-5)(525) & JP-A-55 014 589 (Matsushita) 1 Feb. 1980.
Patent Abstract of Japan, vol. 4, No. 47 (P-6) (529) 11 Apr. 1980 & JP-A-55 17 847 (Matsushita) 7 Feb. 1980.

*Primary Examiner*—A. J. Heinz
*Attorney, Agent, or Firm*—Stevens, Davis, Miller & Mosher

[57] ABSTRACT

The relates to a loading mechanism which can realizes a miniaturized, light-weight and thin magnetic recording/playback apparatus. A running path of a magnetic tape from a position where the tape leaves out of a rotary head cylinder to a capstan is settled merely with roller posts without any fixed post, whereby a tape running load is considerably decreased. Because the loci of movement of take-up and supply loading boats which are respectively guided along associated loading guides correspond to the loci of revolution of drive shafts fixed on loading rings at take-up and supply sides, the loading boats can be driven directly by the drive shafts, whereby a simplified loading mechanism can be achieved.

2 Claims, 18 Drawing Sheets

FIG. 17 PRIOR ART
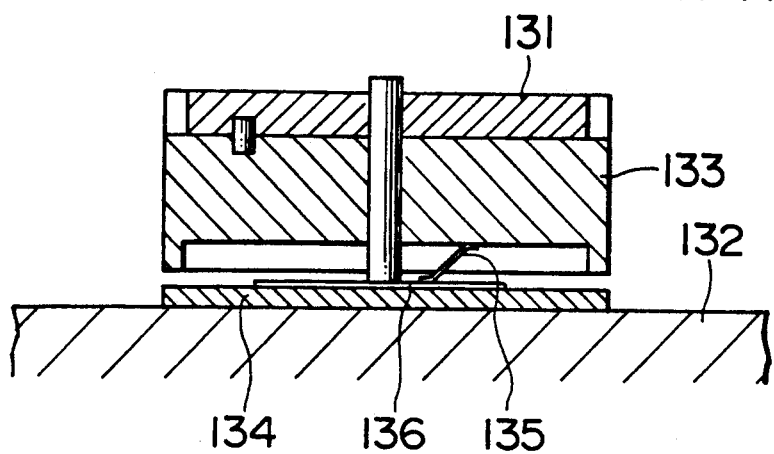
FIG. 18
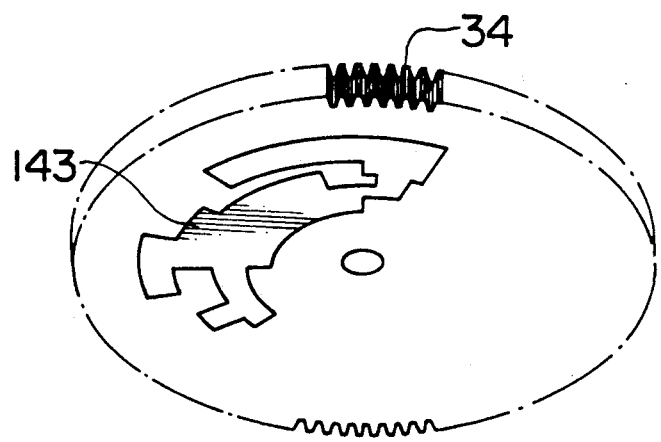
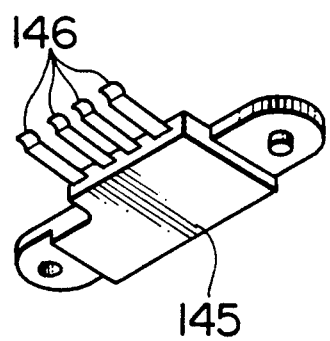

TAPE LOADING DEVICE WITH REDUCED TAPE RUNNING LOAD AND SIMPLIFIED CONSTRUCTION FOR MAGNETIC RECORDING AND/OR REPRODUCING APPARATUS

BACKGROUND OF THE INVENTION

1. Industrial Field of the Invention

The present invention relates to a magnetic recording/playback apparatus, and more particularly, to a loading mechanism which can realize reduction of the size, weight and thickness of such an apparatus.

2. Description of the Prior Art

Recently, various kinds of trials have been made for reducing the size, weight and thickness of a magnetic recording/playback apparatus, especially, a video-camera integrated magnetic recording/playback apparatus. Among others, a number of loading mechanisms in the apparatus have been subjected and practically developed.

A conventional loading mechanism will be described hereinafter with reference to the drawings (FIGS. 15 and 16).

Generally, in the conventional loading mechanism which withdraws a magnetic tape from a tape cassette so as to wind it around the outer periphery of a rotary head cylinder, there are provided one or more fixture posts between a position where the tape leaves out of the rotary head cylinder and a capstan, for forming a running path of the tape.

More specifically, as shown in FIG. 15, the loading mechanism includes first, second and third loading roller posts 91, 92 and 93 which withdraw a magnetic tape 94 from a tape cassette 95 and wind the same around a rotary head cylinder 96. The tape 94 inclinedly leaves from the cylinder 96 by means of the second roller post 92. Then, the tape 94 passes the first roller post 91 and arrives at a inclined fixed post 97 and torsion of the tape 94 is modified by the post 97 so that the inclined path of the tape is converted into a normal horizontally-running path. Thereafter, the running path of the tape is guided for extending to arrive at a capstan 100 through an audio control head 98 and a fixed post 99 (see JP-A-3-127372).

However, in the above-described structure, since two fixed posts, that is, the inclined post 97 and the post 99 are provided in a pathway extending from the position where the tape leaves out of the cylinder 96 to the capstan 100, the tape running load caused by the two fixed posts is increased largely and a tape tension before reaching to the capstan is also increased. As a result, it is impossible to reduce the capstan in size and weight, and further a tape damage is liable to occur.

This is because component parts of the fixed posts for guiding the tape are fixed stationarily with respect to a chassis so that the frictional force between the tape and the fixed posts becomes large, which affects the tape tension to a considerable degree, while the roller posts can guide the magnetic tape smoothly due to rotation of rollers of the posts for guiding the tape.

Further, it is common in the conventional loading mechanism that loading boats (or loading movable carriers) provided with the loading posts are connected to loading rings via relay linkages, for the purpose of moving the loading boats desirably.

More specifically, in the loading device as shown in FIG. 16, a supply side ring gear 101 and a take-up side ring gear 102 each having substantially the same dimensions, are vertically superposed substantially concentrically, in order to guide a supply side boat 104 with a supply loading post 103 along a loading guide 107 and to guide a take-up side boat 106 with a take-up loading post 105 along a loading guide groove 108; the ring gear 101 is connected to the boat 104 via a relay linkage 109 and the ring gear 102 is connected to the boat 106 via a relay linkage 110, in accordance with pathways of movements of the boats 104 and 106.

However, because the relay linkages are always required in such conventional structure and the number of component parts is accordingly increased, there occurs a trouble in improving an assembling efficiency of the apparatus and reducing the size, weight and thickness of the apparatus.

SUMMARY OF THE INVENTION

The present invention solves at least a part of the above-described problems. One object of the invention is to provide a magnetic recording/playback apparatus in which a running path of a magnetic tape from a position where the tape leaves out of a rotary head cylinder to a capstan is settled merely by roller posts without any fixed post so that a tape running load is considerably reduced, thereby exceedingly decreasing a tape tension before reaching to the capstan.

In order to achieve the object, the magnetic recording/playback apparatus of the invention is designed in such a manner that the capstan is disposed to be inclined at an angle substantially equal to those of the take-up loading roller posts in order to drive the tape withdrawn by the take-up loading roller posts while maintaining its posture as it is, whereby the running path of the tape from the take-up loading roller posts to the capstan is settled without any fixed post.

With the above-mentioned structure, since the running path of the tape from the rotary head cylinder to the capstan is formed without using any fixed post, the tape running load can be decreased considerably so that the tape tension before reading to the capstan can be reduced largely. Thus, the reduction of the tape tension before reaching to the capstan permits a required torque of the capstan to be decreased so that it is possible to minimize the size and weight of the capstan. Also, since a press-containing force of a pinch roller is minimized, the pinch roller can be miniaturized and the size and thickness of the press-contacting mechanism for the pinch roller can be reduced. Further, size reduction of a capstan bearing and a pinch roller bearing can be realized. Furthermore, a tape damage hardly arises, due to the reduction of the tape tension.

Because the rotary head cylinder is provided on the chassis substantially vertically, the take-up loading roller posts are inclined more moderately than those of the conventional art, and accordingly, the running path of the tape from the take-up loading roller posts directly to the capstan can readily be realized.

Another object of the invention is to provide a loading post driving device in which relay linkages are eliminated so that an assembling efficiency of the device is increased, the driving device serving to reduce the size, weight and thickness of the magnetic recording/playback apparatus.

In order to achieve the object, the loading post driving device of the invention is arranged in such a manner that the loci of movement of loading boats (or movable carriers) which are guided along take-up and supply loading guides each coincides with the loci of rotation of drive shafts of take-up side and supply side loading rings.

With the structure, since the loci of rotation of the drive shafts fixed on the loading rings each coincides with the loci of movement of the boats guided along the loading guides, the drive shafts each engage with the associated boat so as to drive the same directly, and it becomes possible to move the boats along the loading guides stably. As a result, the conventional relay linkages are eliminated and accordingly, the number of component parts can be reduced. Therefore, an assembling efficiency of the device is improved, thereby reducing the size, weight and thickness of the magnetic recording/playback apparatus.

BRIEF DESCRIPTION OF THE DRAWINGS

FIG. 17 is a cross-sectional view illustrative of a conventional mode switch attachment portion;

FIG. 18 is an exploded perspective view of a mode switch according to the invention;

DETAILED DESCRIPTION OF THE PREFERRED EMBODIMENT

One preferred embodiment of the invention will be described hereinafter with reference to the accompanying drawings.

Figure 3:
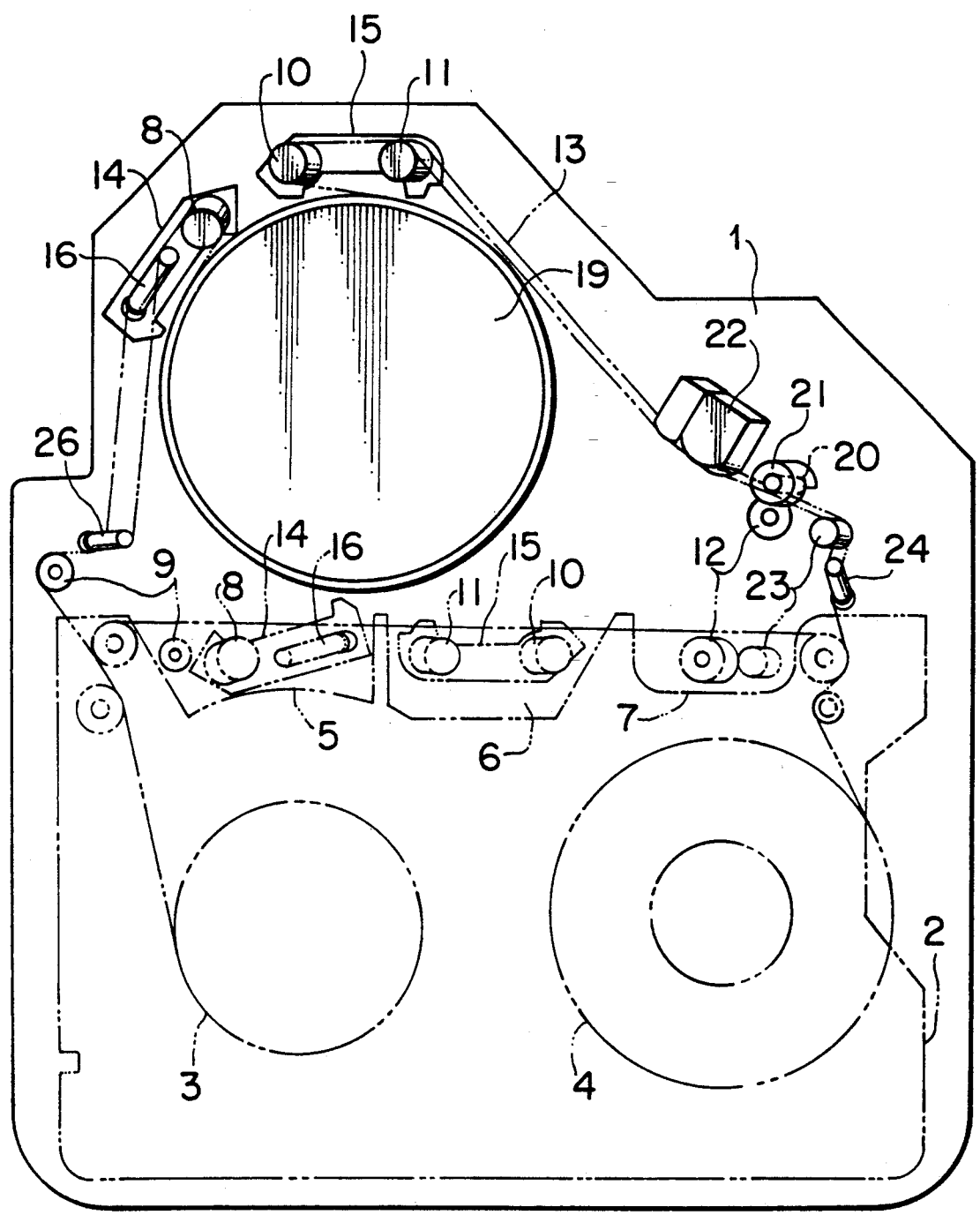
FIG. 3 is a schematic explanatory view of a running path of the tape defined by the loading post driving device.
Figure 4:
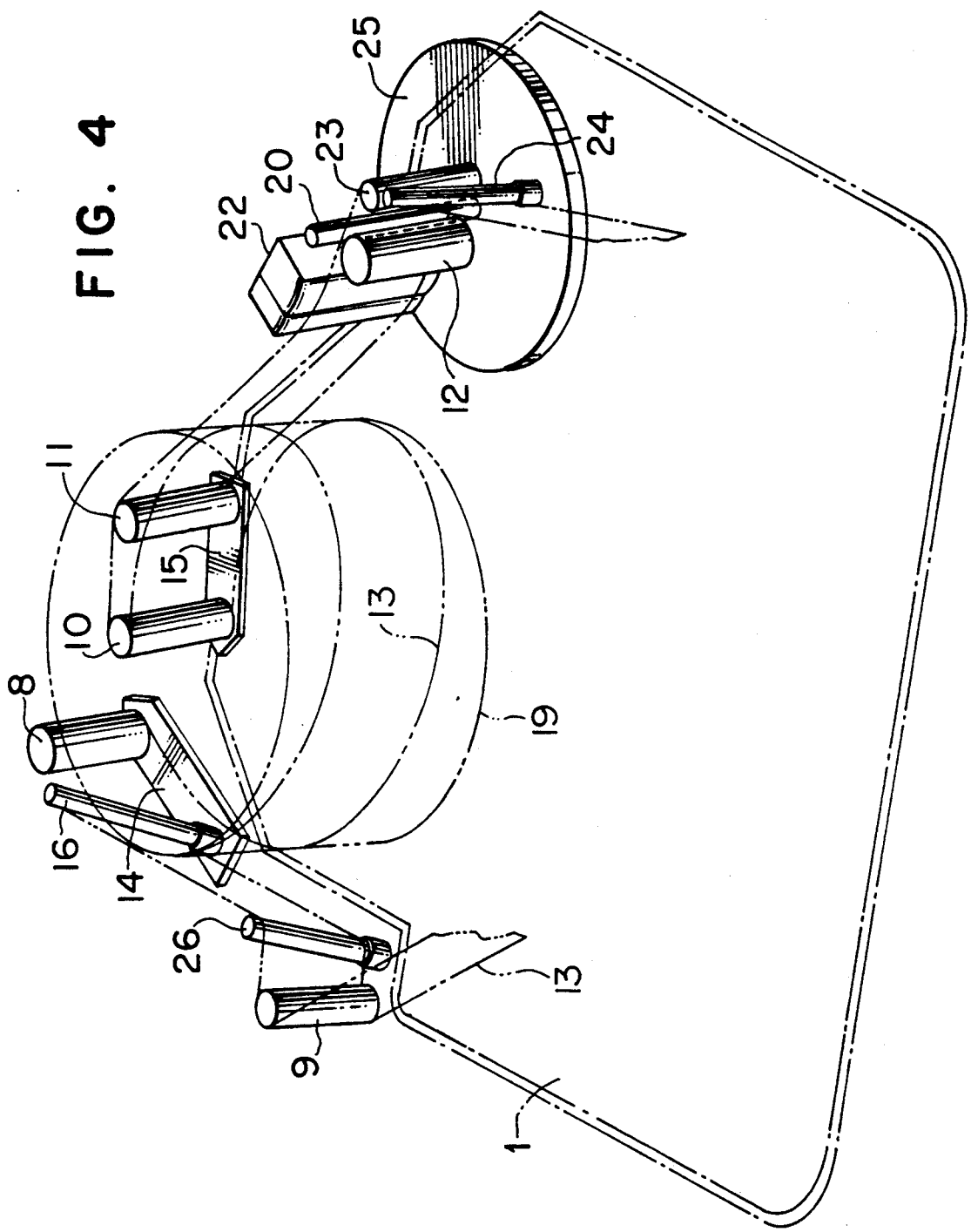
FIG. 4 is a perspective view showing a main portion of the running path of the tape.

At first, an operation of loading posts in a loading mechanism will be schematically explained below (see FIGS. 1 to 4). In FIGS. 3 and 4, a tape cassette 2 is provided with a supply reel 3 and take-up reel 4 to be mounted on a chassis 1 of a magnetic recording/ playback apparatus. When the cassette 2 is charged on the chassis 1, a loading post 8 at the supply side, a tension post 9 and an inclined post 16 are positioned inside of the tape and in a first recession 5 of the cassette, a first and a second loading roller posts 10 and 11 at the take-up side are positioned inside of the tape and in a second recession 6 of the cassette, and a pinch roller 12 and an auxiliary post 23 are positioned inside of a magnetic tape 13 and in a third recession 7 of the cassette.

The recessed portions 5, 6 and 7 are formed on the front portion of the tape cassette 2. The roller post 8 is mounted on a boat 14 at supply side, and the first and the second roller posts 10 and 11 are mounted on a boat 15 at take-up side, respectively. The boat 14 is also provided with the inclined post 16, in addition to the roller post 8, the inclined post 16 being inserted into the recession 5 together with the roller post 8.

Figure 1:
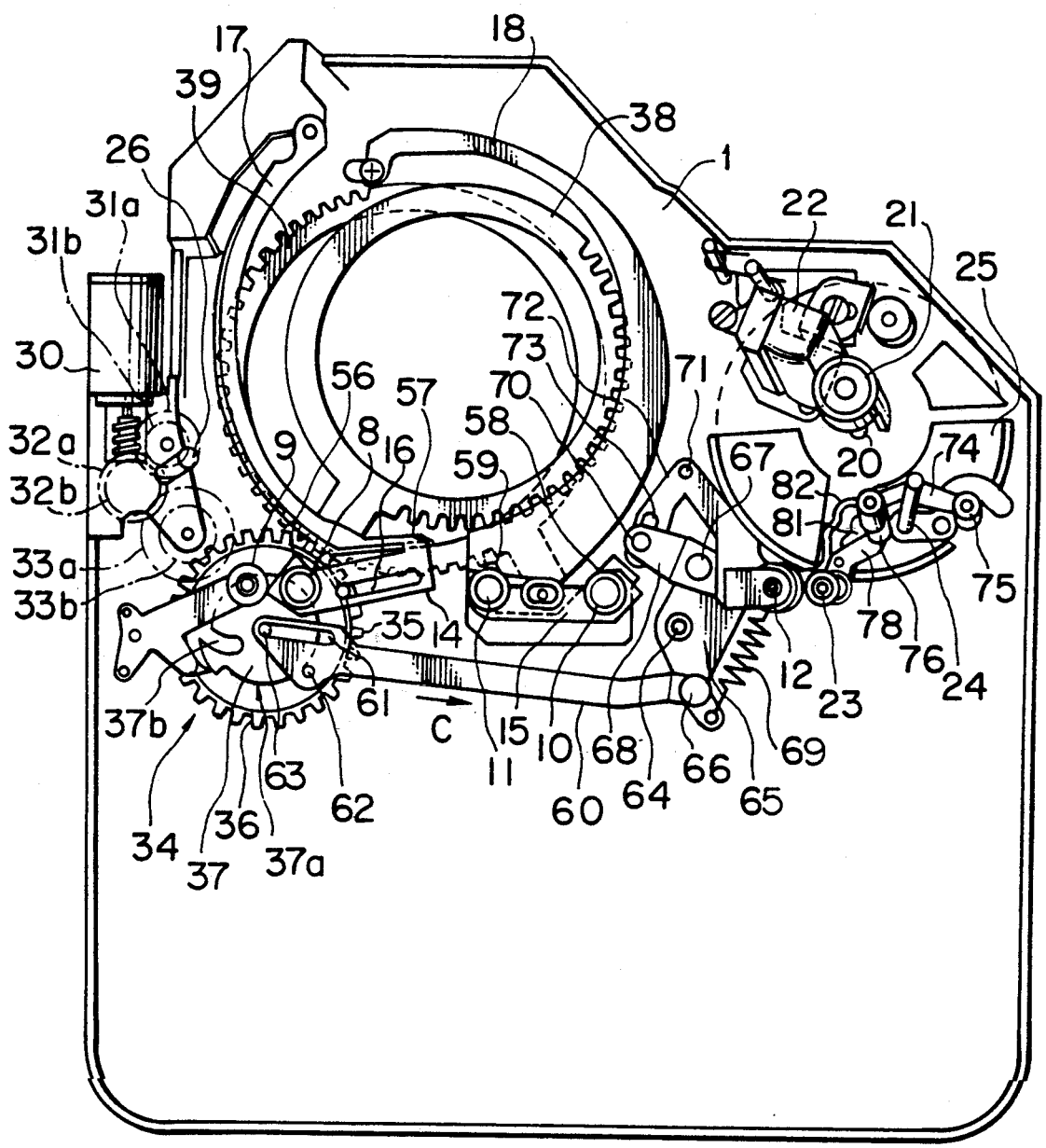
FIG. 1 is a top plan view of an essential portion of a magnetic recording/playback apparatus according to one embodiment of the invention, illustrative of a state of a loading post driving device before loading a tape.
Figure 2:
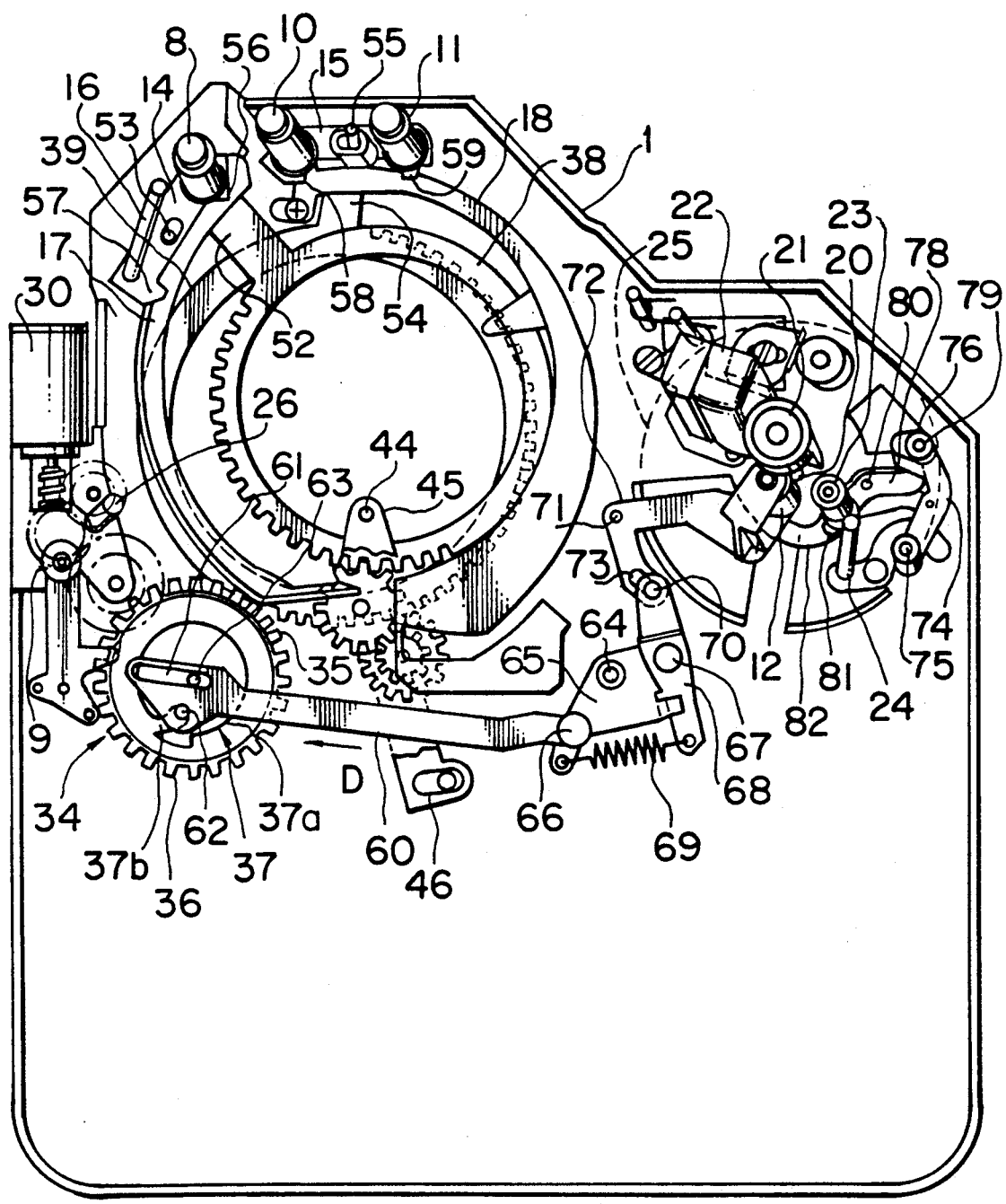
FIG. 2 is a top plan view of the essential portion of the magnetic recording/playback apparatus according to the embodiment of the invention, illustrative of a state of the loading post driving device after loading the tape.
Figure 5:
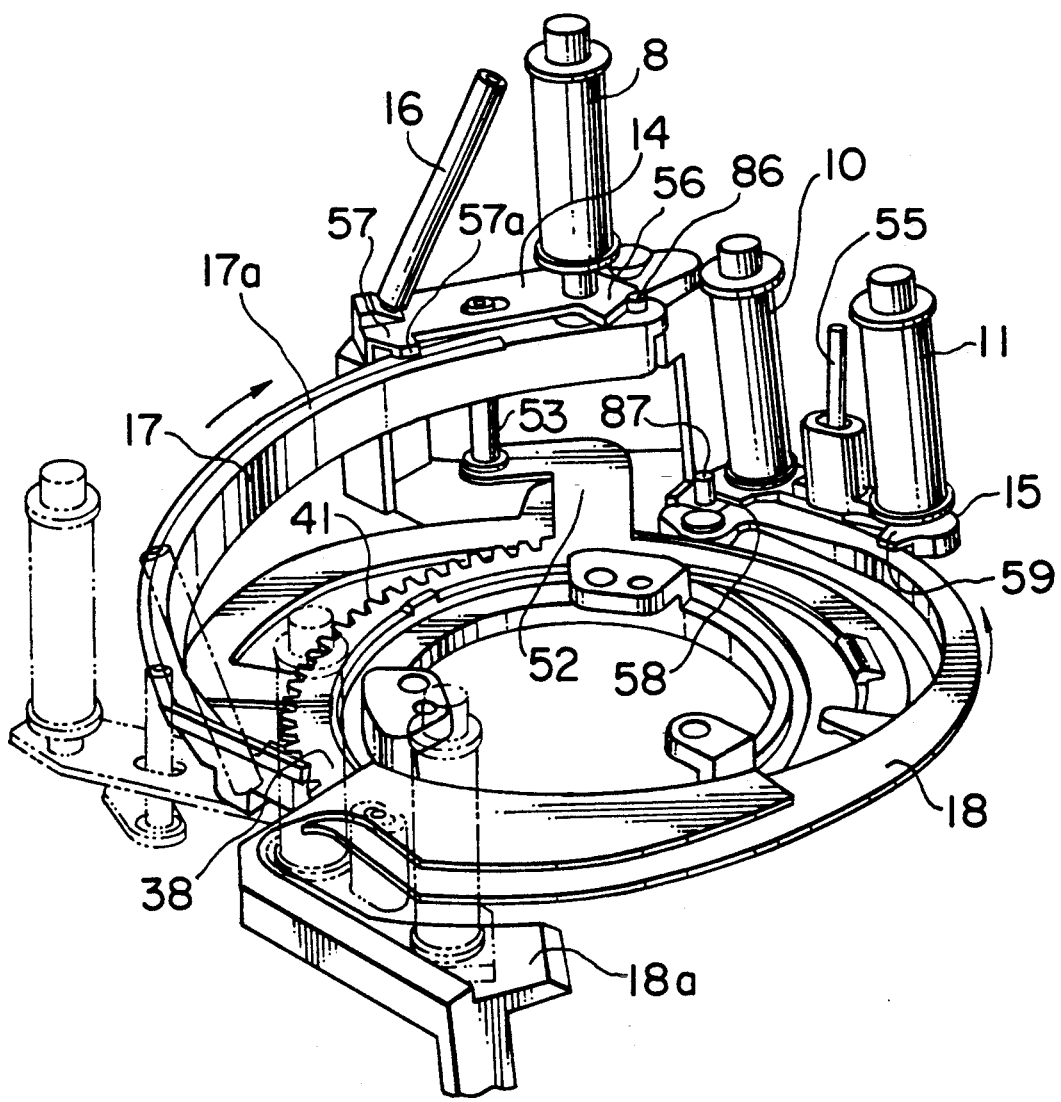
FIG. 5 is a perspective view indicating one main portion of the loading post driving device.

There are provided an arc shape loading guide 17 at supply side and an arc shape loading guide 18 at take-up side along the circumference of a rotary head cylinder 19, the guide 17 operating to guide the boat 14 and the loading guide 18 operating to guide the boat 15, respectively (FIGS. 1 and 2). As shown in FIG. 5, the loading guide 17 is arranged in such a manner that it becomes higher as it comes nearer to a position where an operation of loading the tape is completed; and the loading guide 18 is arranged in such a manner that it becomes lower as it comes nearer to the terminal position in the loading operation.

The rotary head cylinder 19 is attached substantially vertically with respect to the chassis 1. When the boat 14 is moved along the loading guide 17, the roller post 8 winds the tape 13 which is withdrawn out of the supply reel 3 around the rotary head cylinder 19 in a direction extending obliquely upwardly toward the left side as viewed in FIG. 4. When the boat 15 at take-up side is moved along the loading guide 18, the loading roller post 10 winds the tape 13 withdrawn out of the take-up reel 4 around the rotary head cylinder 19 in a direction extending obliquely downwardly toward the right side as viewed in FIG. 4. At this time, the loading roller post 8 is in a posture of being inclined slightly backward, i.e., oppositely to a direction in which the supply side boat advances at the loading terminal position because of the slope of the loading guide 17 which becomes gradually higher toward the loading terminal position; and the loading roller posts 10 and 11 are in postures of being inclined slightly forwardly, i.e., in the direction in which the take-up side boat advances because of the slope of the take-up loading guide 18 which becomes gradually lower toward the other loading terminal position.

Thus, as shown in FIG. 4, the tape 13 which is drawn out from tape cassette 2 runs parallel with chassis 1, while being guided by tension post 9, and is then wound partially around fixed inclined post so that it then runs obliquely upwardly and rises gradually. Subsequently, tape 13 is wound partially around inclined post 16, which changes the tape running direction; the tape is then wound partially around supply side loading post 8, thereafter running toward rotary head cylinder 19. The tape supplied onto the circumferential surface of the rotary head cylinder is guided along the surface from an upper portion toward a lower portion. At a position where the tape 13 leaves from the rotary head cylinder, the tape 13 is turned so as to be introduced into a gentle-slope path of the tape extending obliquely upwardly from the lower portion of the cylinder 19 via the first take-up loading roller post 10. While the tape 13 is being maintained to be slightly inclined forwardly by the loading roller post 11, it is introduced obliquely upwardly along the gentle sloped path.

A capstan 20, which is provided on the chassis 1 outside a location where the cassette 2 is to be mounted, is supported at its upper and lower ends by bearings 21 and attached to the chassis 1 such that it is inclined at an angle substantially equal to those of the loading posts 10 and 11 at the loading terminal position.

The tape 13, which is introduced obliquely upwardly from the loading roller post 11 along the sloped path and is inclined forwardly, is brought into full contact with the inclined capstan 20 at entire width of the tape. When finishing the loading operation, the capstan 20 is in press-contact with the pinch roller 12 which is moved from the position of the recession 7 of the cassette 2 so that the tape 13 is held between the capstan 20 and the pinch roller 12 to be driven. Incidentally, the pinch roller 12 is arranged to have the same inclination angle as that of the capstan 20 in order to be full contact with the capstan 20 at entire width of the tape.

An audio-control head, which is provided at a location in the vicinity of the capstan 20 between the second loading roller post 11 and the capstan 20 at the loading terminal position, is attached to the chassis 1 in such a manner that it is inclined at the same angle as that of the capstan 20 in order to facilitate a contact between the audio-control head 22 and the magnetic tape 13 under the condition that the tape 13 is forwardly inclined and introduced obliquely upwardly along the sloped path from the loading roller post 11 to the capstan 20.

The auxiliary guide post 23 which moves in cooperation with the pinch roller 12 is positioned in the recession 7 of the cassette 2 before starting the loading operation of the tape 13, and it moves together with the pinch roller 12 when completing the tape loading operation, to thereby guide the tape 13 travelling between the capstan 20 and the pinch roller 12 to lead to a fixed inclined post 24. As regards the tape 13 fed through the capstan 20 and the auxiliary guide post 23 while maintaining the forwardly-inclined posture, torsion of the magnetic tape 13 generated when the tape travelling is converted from the sloped path into a horizontally running path is corrected by the inclined fixed post 24 which is slantingly attached to the chassis 1 before the tape 13 reaches the cassette 2, then being wound around the take-up reel 4 of the tape cassette 2. A capstan motor 25 for driving the capstan 20 is inclinedly fixed to the chassis 1. With the structure of the inclined motor, it becomes unnecessary to arrange the capstan 20 below the position where the cassette 2 is to be mounted. Therefore, a thickness of the chassis 1 is released from being increased so that it is readily possible to realize a thin magnetic recording/playback apparatus.

Next, the description concerning a driving device for the loading posts will be given below.

Figure 7:
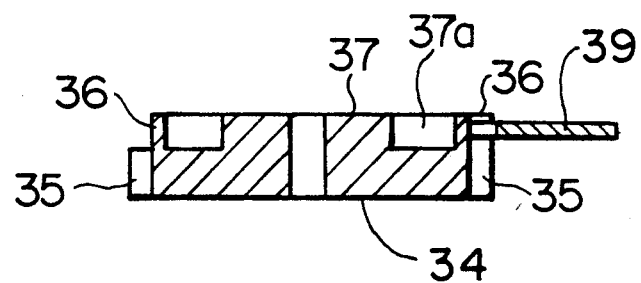
FIG. 7 is a cross-sectional view of a cam gear means.

Referring again to FIG. 1, driving force of a loading motor 30 is transmitted to a cam gear means 34 through two-staged gears 31a, 31b, two-staged gears 32a, 32b, and two-staged gears 33a, 33b. As shown in a cross-sectional view of FIG. 7, the cam gear means 34 comprises a gear 35, an intermittent gear 36 and a cam 37. The gear 35 is a lower half portion of the cam gear means 34 and of which teeth are formed on the entire outer periphery. The driving force of the loading motor 30 is transmitted to the gear 35 via the gear 33b being meshed with the gear 35. The intermittent gear 36 is an upper half portion of the cam gear means 34 and by which the driving force is transmitted to the loading roller posts 10 and 11. The cam 37 is formed on the top surface of the cam gear means 34 and used for controlling the pinch roller 12 to press-contact with or separate from the capstan 20. Since the gear 35, the intermittent gear 36 and the cam 37 are integrally formed as one piece of the cam gear means 34, the thickness of the means 34 can be sufficiently reduced.

The operation of the loading roller posts 8, 10 and 11, which are driven by means of the intermittent gear 36 of the cam gear means 34, will be described hereinafter, with reference to FIG. 9.

Figure 9:
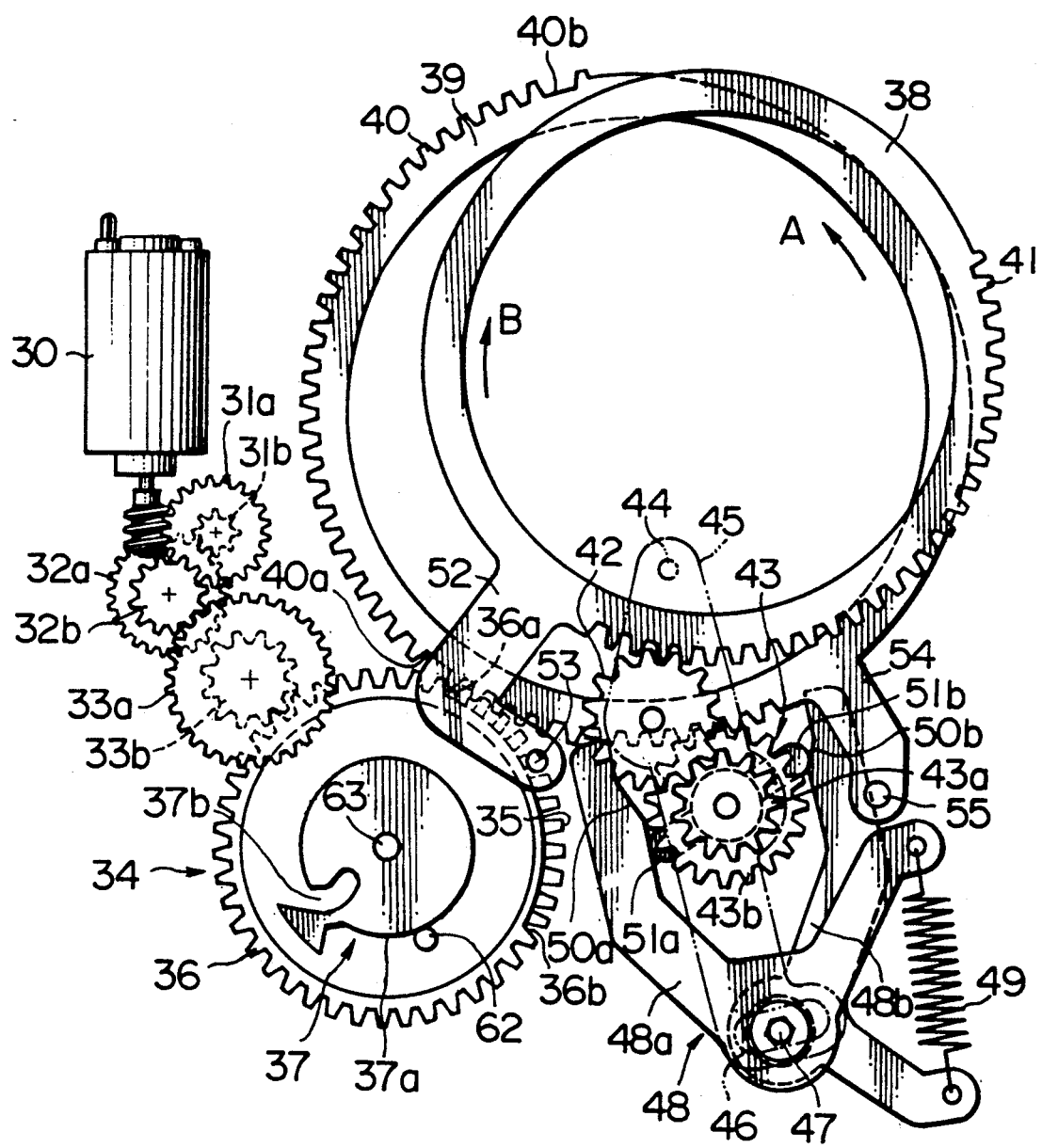
FIGS. 9 to 13 are explanatory views each showing a state of a boat driving gear train in a process of the loading operation.

FIG. 9 is a top plan view illustrating a gear train of the driving mechanism for the loading roller posts. A ring gear 38 at the side of supplying the tape for driving the loading roller post 8, and a ring gear 39 at the side of taking up the tape for driving the loading roller posts 10 and 11 are provided below the rotary head cylinder 19 in such a manner that the center points of rotation of the ring gears are deviated from each other. A teeth region 40 extending over a predetermined range on the outer periphery of the ring gear 39 are arranged so as to mesh with the intermittent gear 36 of the cam gear means 34. There are respectively provided first and second toothless regions 40a and 40b at intermediate and rear end portions of the teeth region 40 when viewed in a direction of an arrow A which denotes a direction of rotation of the ring gear 39 during loading the tape, the first and second toothless regions being capable of engaging with or separating from terminal ends 36a and 36b of the intermittent gear 36 for the purpose of ensuring the starting operation of the loading.

A teeth region 41 extending over a predetermined range on the outer periphery of the ring gear 38 is cooperatively connected with the teeth region 40 of the ring gear 39 through an intermediate gear 42, gears 43a and 43b of a two-staged pendulum gear 43. The intermediate gear 42 is meshed with the teeth region 41 of the ring gear 38 at supply side. The one gear 43a of the pendulum gear 43 is meshed with the intermediate gear 42. The intermediate gear 42 and the pendulum gear 43 are pivotally mounted on a swing plate 45 which is swingably attached at its one end to a shaft 44 provided on the chassis 1. A shaft 47 which is provided on the chassis 1 is fitted into an elongated opening 46 formed at the other end of the swing plate 45 in order to control swinging movement of the plate 45.

Two arm pieces 48a and 48b both ends of which constitute A tetra arm mechanism 48 are pivotally supported by the shaft 47 and has two arms 48a and 48b. The pendulum gear 43 is located between each one arm of the arm pieces 48a and 48b. Both ends of the other arms of the arm pieces 48a and 48b are connected with each other by a tension coil spring 49 so that each one arm of the arm pieces 48a and 48b are always urged against the gear 43. Further, protruded portions 50a and 50b with slopes are formed on opposite inner sides of the arm pieces 48a and 48b. The arms 48a and 48b are arranged to forcedly rotate the pendulum gear 43 in any direction, by biasing the slopes against end-face cam portions 51a and 51b which are provided on the pendulum gear 43 so as to protrude oppositely, i.e., in directions apart from each other by an angle of 180.°

A fixed arm 52 is provided at the front end (when viewed in a direction of an arrow B which indicates a rotating direction of the ring gear 38 during loading the magnetic tape 13) of the teeth region 41 of the ring gear 38. The fixed arm 52 has a drive shaft 53 attached to extend upright at the distal end portion of the fixed arm 52. Similarly, a fixed arm 54 is provided at a front end of the teeth region 40 of the take-up side ring gear 39 when viewed in the direction of the arrow A indicating the rotating direction of the ring gear 39 at take-up side during loading the magnetic tape 13, the fixed arm 54 extending from the front end of the teeth region 40. The fixed arm 54 includes a drive shaft 55 at take-up side set to extend upright at its distal end portion of the fixed arm 54. As understood from FIG. 5, the boat 14 at supply side is attached to the drive shaft 53 vertically movably. The boat 14 includes at its front and rear ends a front-end holder portion 56 and a rear-end holder portion 57 both of which outwardly engage with the outer periphery of the loading guide 17 at supply side. The front-end holder portion 56 has a U-shaped cross section so as to be detachably guided by the loading guide 17. The rear-end holder portion 57 has a U-shaped cross section and is provided at its top end with a claw 57a to be fitted in a groove 27a extending along the outer periphery of the guide 17, so that the boat 14 is guided along the loading guide 17.

Figure 6:
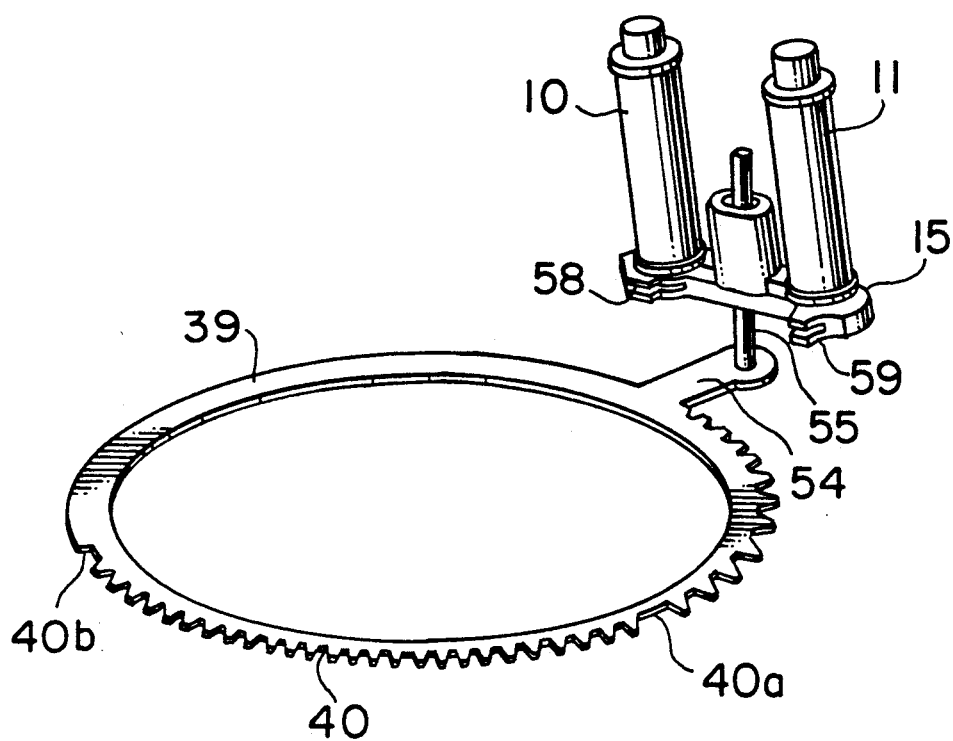
FIG. 6 is a perspective view indicating another main portion of the loading post driving device.

Also, as shown in FIGS. 5 and 6, the boat 15 is attached to the take-up side drive shaft 55 vertically movably. The boat 15 includes at its front and rear ends a front-end holder portion 58 and a rear-end holder portion 59 both of which outwardly engage with the outer periphery of the loading guide 18. The front end holder portion 58 has a U-shaped cross section so as to be detachably guided by the loading guide 18. The rear-end holder portion 59 has a U-shaped cross section, so that the boat 15 is guided along the loading guide 18.

The drive shafts 53 and 55 are designed to move along the circular outer peripheries of the loading guides 17 and 18, when the ring gear 38 at supply side and the ring gear 39 at take-up side rotates in the direction B and in the direction A during loading the tape, respectively. In this way, the boats 14 and 15 are guided stably because the front-end holder portion 56 of the boat 14 and the front-end and the rear-end holder portions 58, 59 of the boat 15 are not disconnected from the outer periphery of the loading guide 17 and 18 in course of the loading operation of the tape, owing to the fact that each locus of movement of the drive shafts 53 and 55 substantially corresponds to the associated configuration of the loading guides 17 and 18. The boat 14 is forced to gradually ascend to become higher as it comes closer to the loading terminal position, while the boat 15 is forced to gradually descend to become lower as it comes closer to the loading terminal position.

The rear-end holder portion 59 of the boat 15 is not released from the outer periphery of the loading guide 18 even before starting the loading operation, as shown by the phantom line in FIG. 5, thanks to a structure of a terminal end portion of the loading guide 18.

A press-contacting mechanism for the pinch roller 12 will be explained below with reference to FIGS. 1 and 2, and FIG. 8 which is an exploded perspective view partially illustrative of the pinch roller press-contacting mechanism.

With the mechanism, the pinch roller 12 comes in press-contact with the capstan 20 by means of the cam 37 of the cam gear means 34. In FIGS. 1 and 2, the cam 37 comprises a cam groove 37a extending in the circumferential direction and a bent cam groove 37b extending toward the center of the cam gear means 34 for biasing the pinch roller 12 against the capstan 20 after completion of the loading operation of the magnetic tape 13. A lever 60 which moves in cooperation with the cam 37 of the means 34 includes an elongated hole 61 formed at one end of the lever in the longitudinal direction thereof, and a cam follower 62 for engagement with the cam grooves 37a and 37b provided on the cam 37. A shaft 63 of the cam gear mean 34 is fitted in the elongated hole 61. The other end of the lever 60 is connected to one end of a plate 65 via a pin 66, the plate 65 being pivotally supported by a shaft 64 one end of which is set on the chassis 1. A lever 68 supported at its intermediate portion by a pin 67 is connected to the other end of the plate 65. A tension coil spring 69 is interposed between one ends of the plate 65 and the lever 68. A pin 70 attached at the other end of the lever 68 is fitted in an elongated hole 73 formed at one end of a bell crank 72 which is rotatably retained on the chassis 1 through a pin 71. The pinch roller 12 is provided at the other end of the bell crank 72 such that it is inclined at the same angle as the capstan 20.

Figure 8:
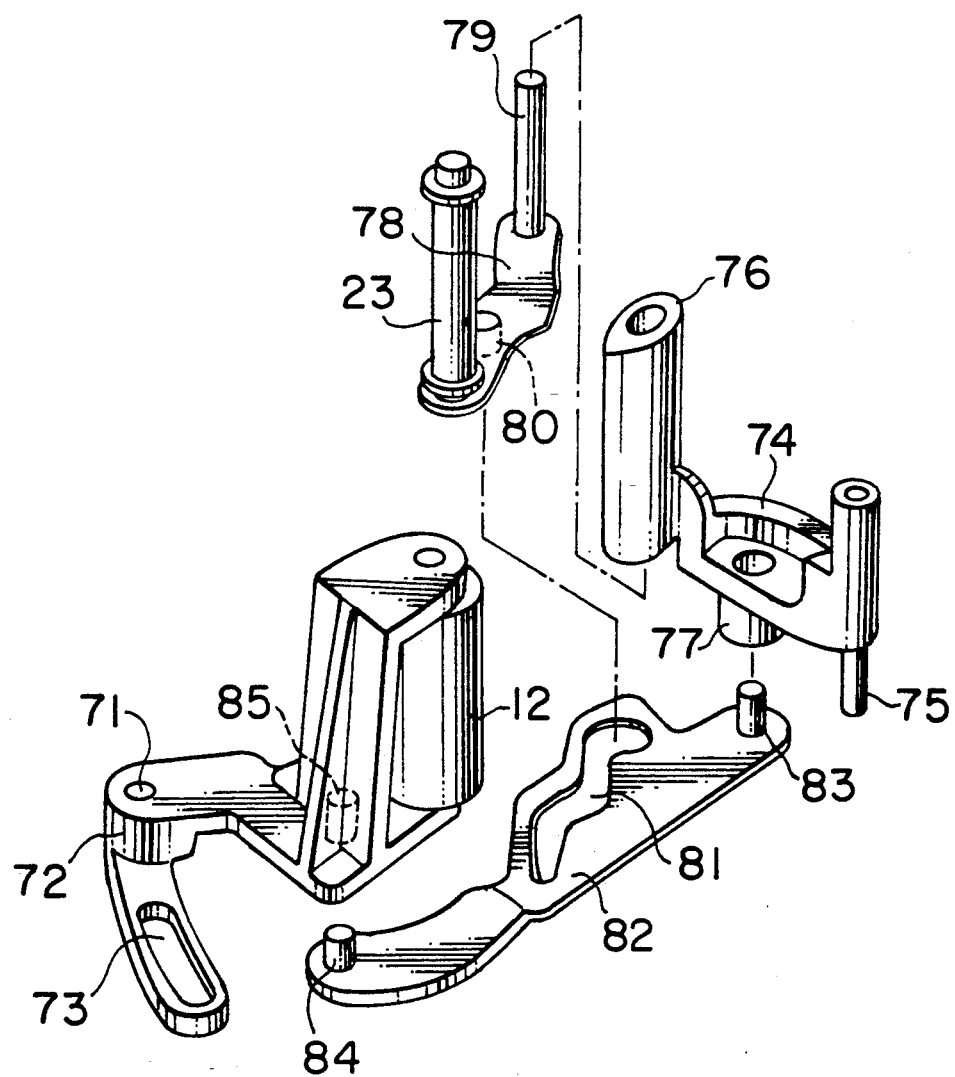
FIG. 8 is an exploded perspective view for explanation of one portion of a pinch roller press-contacting mechanism.

In FIG. 8, an arm 74 is supported by a shaft 75 set on the chassis 1. The arm 74 is provided with a bearing sleeve 76 at its one end and with a bearing sleeve 77 at its central portion. A pin 79 is fixed at the rear end of an arm 78 including the auxiliary roller post 23. The post 23 is inclinedly attached to the distal end of the arm 78 at an angle substantially similar to the inclination angle of the capstan 20. The pin 79 is inserted into the bearing sleeve 76 from the lower side thereof. A pin 83 is fixed at the rear end of an arm 82 including a groove 81 for fitting therein a pin 80 provided on the lower surface of the arm 78 at the center thereof. The pin 83 is inserted into the bearing 77 from the lower side thereof. A pin 84 provided at a distal end of the arm 82 is inserted in a hole 85 from the lower side thereof, the hole 85 being formed on the lower surface of the bell crank 72 in the vicinity of the pinch roller 12.

Now, a mode switch provided on the lower surface of the cam gear means 34 will be explained with reference to the drawings.

In general, the mode switch in the magnetic recording/playback apparatus may be attached in such a manner as to be shown in, for example, FIG. 17.

Referring to FIG. 17, a cam gear 131 is mounted on the upper side of a rotary brush holder (or carrier) 133 on a chassis 132. The driving force of a loading motor is transmitted to the cam gear 131, and it is then transmitted to a ring gear at supply side and a ring gear at take-up side from the cam gear 131. There is mounted on the chassis 132 a foil attachment member 134 including a metallic foil layer 136 on its upper surface so as to correspond to metallic brushes 135. One ends of the brushes 135 are connected to the lower surface of the rotary brush holder member 133 and the other ends thereof are free.

Owing to the above structure, the brushes 135 establish an electrical connection at a position where the foil layer 136 exists during rotation of the cam gear 131. The brushes 135 detect "on" or "off" so that a phase of the cam gear 131 or the practical modes of the mechanisms are determined to control the mechanisms.

However, in the portion including the brush 135 and the foil layer 136 where the mode switch is attached, a height from the upper surface of the chassis 132 and the upper surface of the cam gear 131 is large so that a thickness of the magnetic recording/playback apparatus is increased, which results in a hindrance to reduction in thickness of the apparatus.

In order to solve the above-described problems, in the embodiment according to the invention, at least a brush holder member is positioned within a recessed opening portion of the chassis so that a thickness of the attachment portion of the mode switch may be reduced, thereby realizing reduction in thickness of the apparatus and further miniaturizing the apparatus.

The detailed description of the cam gear means 34 rotatably provided on the chassis 1 will be given with reference to FIGS. 19 to 23.

The driving force of the loading motor 30 is transmitted to the cam gear means 34, and it is further transmitted to the ring gear 38 and ring gear 39 from the cam gear means 34. A metallic foil layer 143 is adhered to a back surface of the cam gear means 34. A plurality of metallic brushes 146 attached to a brush holder 145 positioned in a recessed opening portion 144 of the chassis 1 are arranged to contact with the foil layer 143 at their distal ends. More specifically, the brush holder 145 has a thickness substantially equal to that of the chassis 1 and is received on the chassis at both opposite ends thereof so as to be secured by means of screw fasteners 147. The plurality of brushes 146 are fixed to the brush holder member 145 in such a manner tat they elastically contact with the foil layer 143 on the back surface of the cam gear means 34 at their distal ends. Accordingly, the respective brushes 146 establish an electrical connection at the position where the foil layer 143 exists during rotation of the cam gear means 34, and detect "on" or "off" and the phase of the cam gear means 34, that is, the position of the mechanism, thereby controlling an operation of the magnetic recording/playback apparatus.

Figure 22:
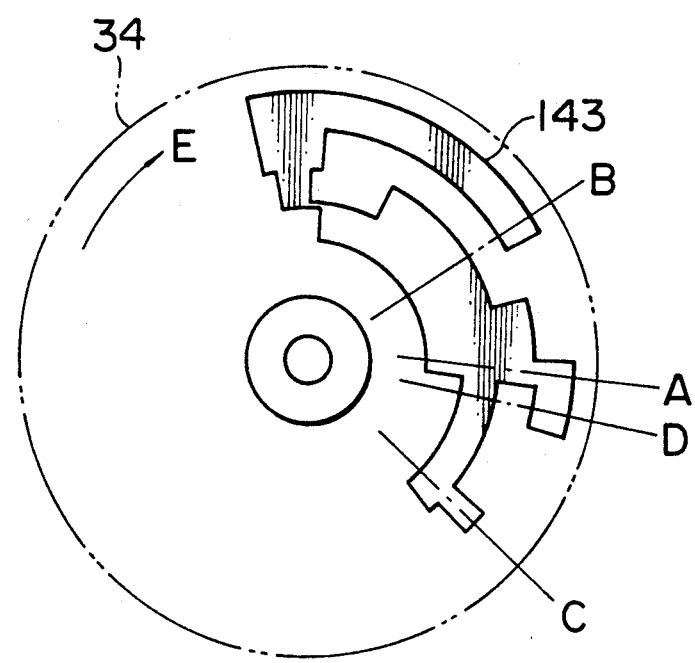
FIG. 22 is a top plan view illustrative of a connected state of a foil layer.

Meanwhile, the foil layer 143 is provided on the back surface of the cam gear means 34 in such a manner as to be shown in FIG. 22. The operation of the magnetic recording/playback apparatus is controlled, by bringing the respective brushes 146 into connection or disconnection with respect to the foil layer 143. That is to say, when the brushes 146 are in contact with the foil layer 143 at a position A in FIG. 22, a state of "eject" is detected; when the brushes are in contact with the foil layer at a position B in FIG. 22, a state of "starting to load the tape" is detected; when the brushes are in contact with the foil layer at a position C in FIG. 22, a state of "completing the loading" is detected; and when the brushes are in contact with the foil layer at a position of D in FIG. 22, a state of "play" is detected. In addition, in FIG. 22, an arrow E shows a rotating direction of the cam gear means 34 during loading the tape.

As mentioned above, according to the invention, the foil layer is provided on the back face of the cam gear means serving to transmit the driving force from the loading motor. The brush holder member including a thickness substantially equal to that of the chassis is positioned in the recessed opening portion of the chassis. The distal ends of the brushes protruding from the brush holder member are contacted with the foil layer of the cam gear means, to thereby constitute the mode switch. The thickness of the mode switch mounting portion is decreased, by setting at least the brush holder member in the recessed opening portion of the chassis, thereby preferably obtaining a thin and miniaturized magnetic recording/playback apparatus.

The loading operation by means of the above-mentioned mechanism will be described more particularly. FIGS. 9 to 13 are explanatory views each showing a state of the gear train in a process of the loading operation. FIGS. 1 and 9 illustrate a state of the gear train before starting the loading operation, respectively. In the state, the boat 14 at supply side and the boat 15 at take-up side are located at unload positions at the beginning ends of the loading guide 17 at supply side and the loading guide 18 at take-up side, respectively. As shown in FIG. 3, the tension post 9, the loading roller post 8 at supply side, and the inclined post 16 are inserted in the first recessed portion 5 of the tape cassette 2; and the first and the second loading roller posts 10 and 11 are inserted in the second recessed portion 6. The lever 60 is forcedly moved in a direction of an arrow C by means of the cam follower 62, so that the pinch roller 12 is retreated at the position most remote from the capstan 20 via the plate 65, the lever 68, and the bell crank 72. And, in a similar manner to the pinch roller 12, the auxiliary roller post 23 is also retreated at the position most remote from the capstan 20 by means of the arms 82, 74, and 78 which move in cooperation with the pinch roller 12. As a result, as shown in FIG. 3, the pinch roller 12 and the auxiliary roller post 23 are both inserted in the third recessed portion 7 of the tape cassette 2.

The supply movable carrier 14 is supported on the supply loading guide 17 merely by the rear-end holder portion 57 thanks to the configuration of the beginning end of the supply loading guide 17. The front-end holder portion 56 of the boat 14 is disconnected from the guide 17. Similarly, the boat 15 is supported on the loading guide 18 by the rear-end holder portion 59 engaging with the loading guide 18 and a pedestal 18a shown in FIG. 5 as illustrated by a phantom line of FIG. 5, thanks to the configuration of the beginning end of the loading guide 18. The front-end holder 58 of the boat 15 is disconnected from the guide 18.

In FIG. 9, as soon as the loading operation is started, the cam gear means 34 rotates in a clockwise direction. The intermittent gear 36 of the cam gear means 34 is meshed with the teeth region 40 of the ring gear 39 at take-up side because the terminal end 36a of the intermittent gear 36 is received in the first toothless region 40a of the ring gear 39. Then, the ring gear 39 rotates in the direction of the arrow A by rotation of the intermittent gear 36. The ring gear 38 at supply side rotates in the direction of the arrow B through the pendulum gear 43 and the intermediate gear 42 which rotates in cooperation with the ring gear 39.

Figure 14:
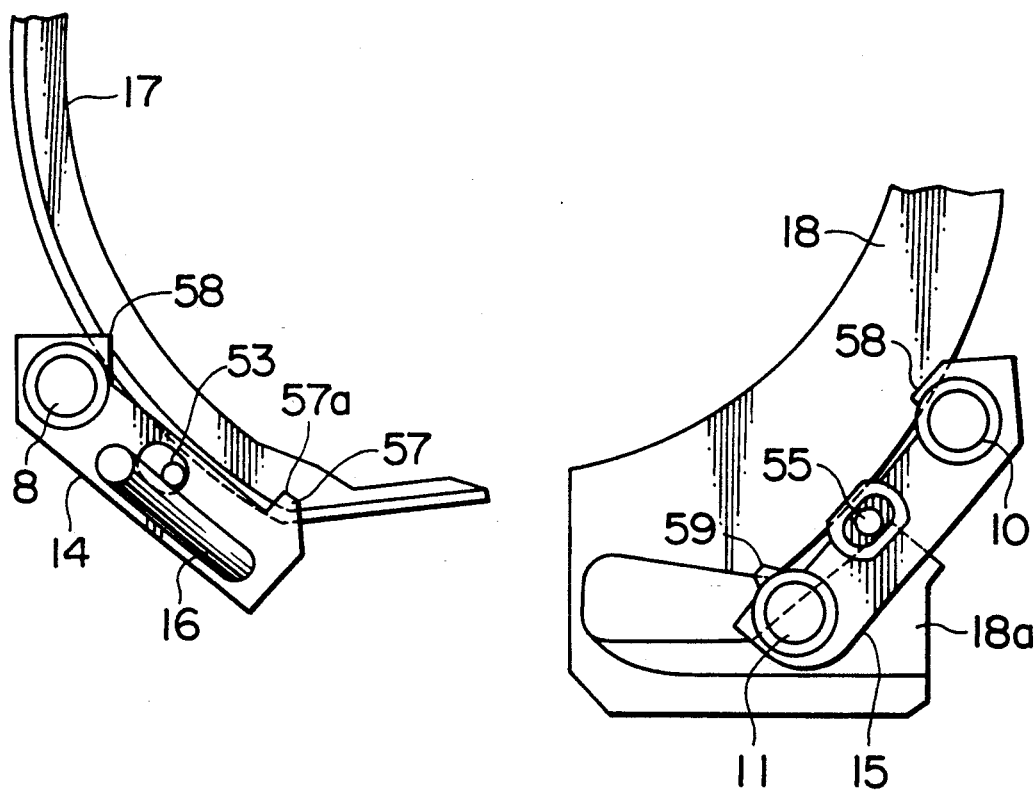
FIG. 14 is an explanatory view which illustrates a state that the loading boats are engaged with loading guides, respectively, during the loading operation.
Figure 15:
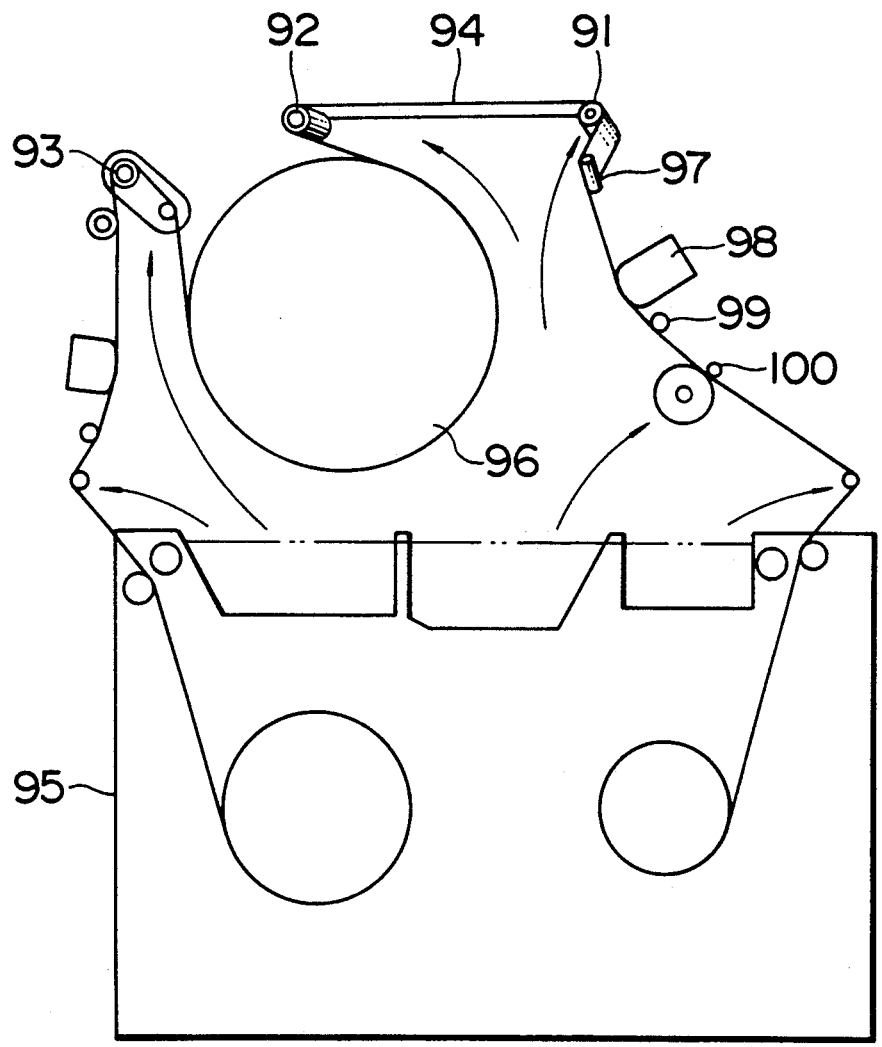
FIGS. 15 and 16 are schematic top plan views of a conventional loading post driving device.
Figure 16:
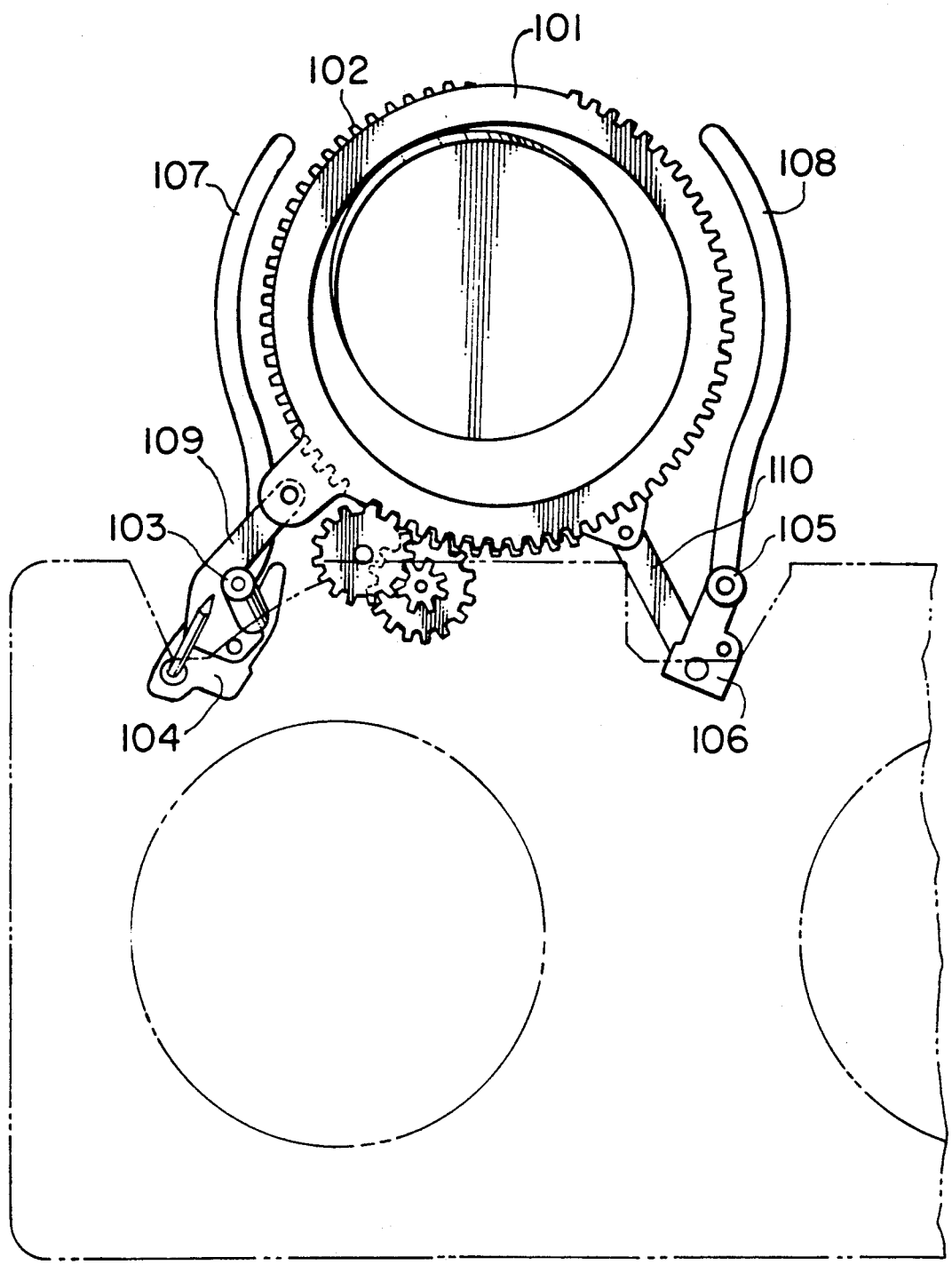
Figure 19:
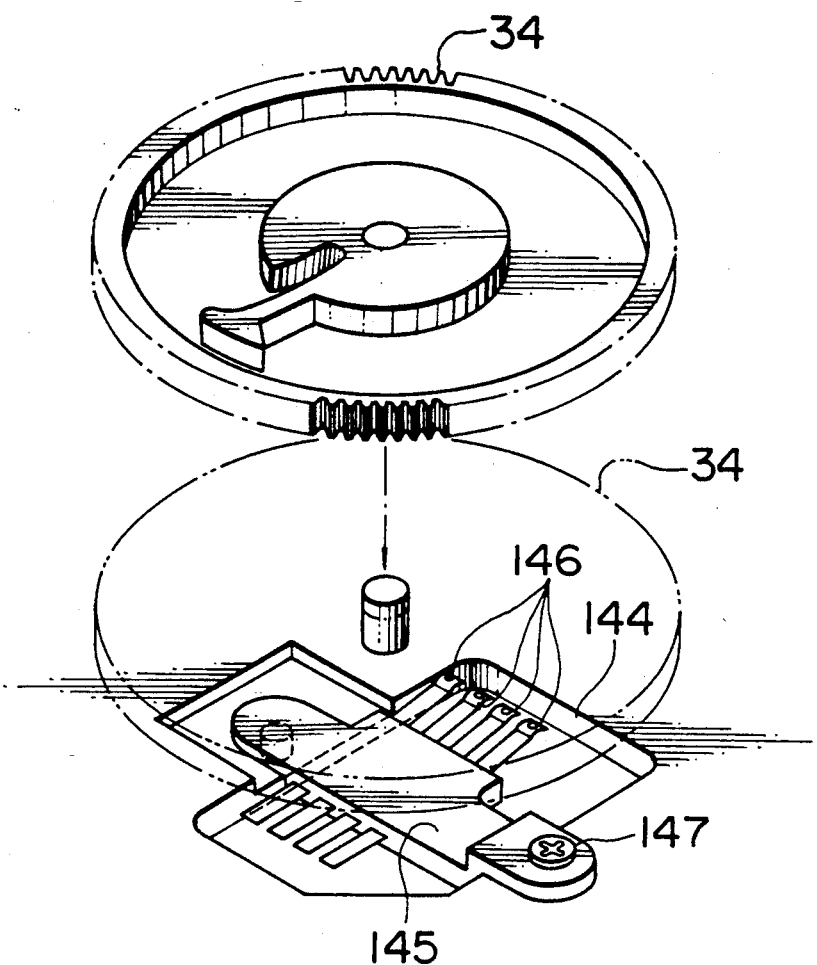
FIG. 19 is a perspective view showing a state that a brush holding member is mounted on a chassis.
Figure 20:
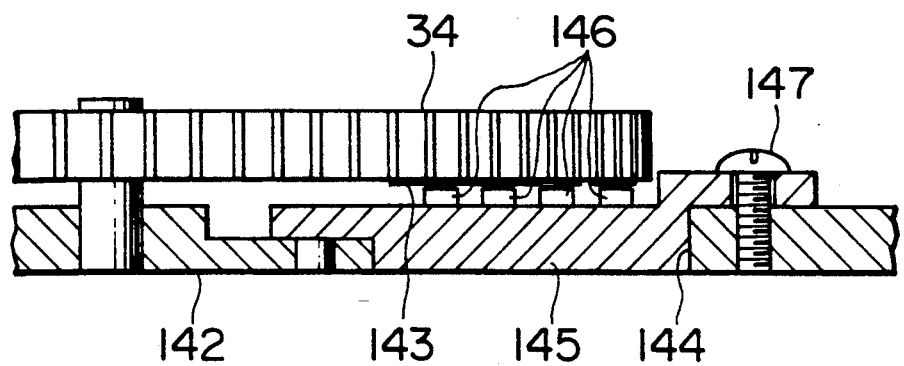
FIG. 20 is a cross-sectional view showing a state that the brush holding member and the cam gear means are mounted on the chassis.
Figure 21:
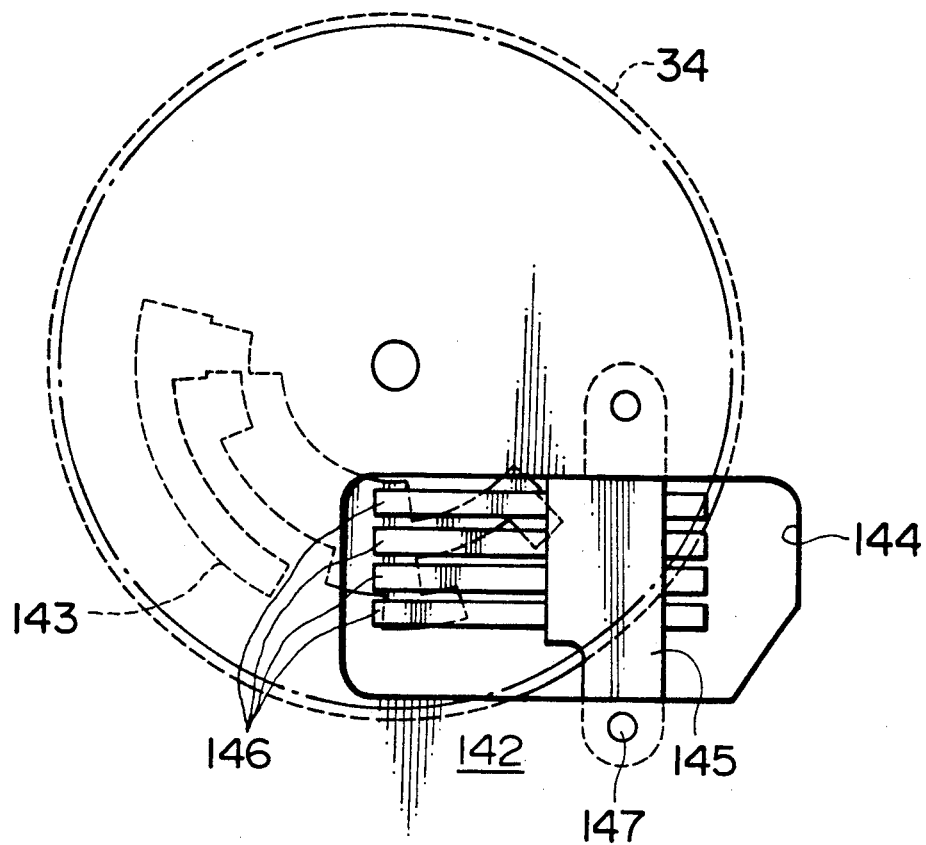
FIG. 21 is a bottom view of the brush holding member and the cam gear means in the state that they are mounted on the chassis.

Subsequently, the boat 14 is driven in the loading direction by means of the drive shaft 53 provided on the fixed arm 52 of the ring gear 38. At this time, the drive shaft 53 accurately moves in cooperation with the ring gear 38, while the rear-end holder portion 57 of the boat 14 moves linearly along a straight portion at the beginning end of the loading guide 17 at supply side. Therefore, the front-end holder portion 56 of the boat 14 gradually comes closer to the loading guide 17 in accordance with the movement of the boat 14. When the rear-end holder portion 57 moves to the circular portion of the loading guide 17, as shown in FIG. 14, the front-end holder portion 56 engages with the outer peripheral of the loading guide 17. Thereafter, the boat 14 is moved stably because it is supported at three positions by the drive shaft 53, the front-end and the rear-end holder portions 56 and 57, whereby the magnetic tape 13 is withdrawn out of the cassette 2 and wound around the rotary head cylinder 19 uniformly and surely by the loading roller post 8 at supply side. The boat 15 at take-up side is also moved in a manner similar to the boat 14.

Figure 10:
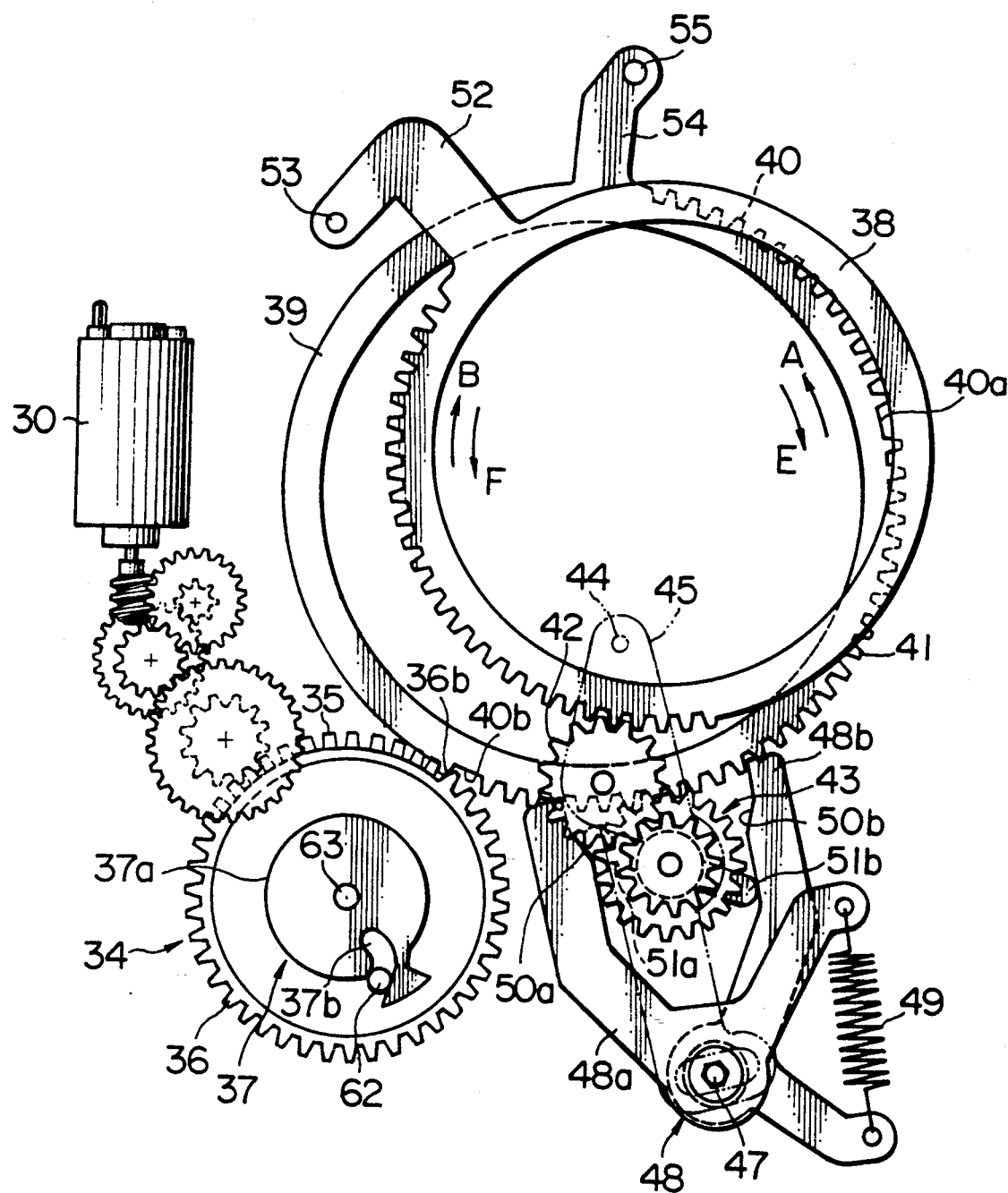

In succession with this, just before completing the loading operation when the boats 14 and 15 come in contact with stoppers 86 and 87 shown in FIG. 5, as illustrated in FIG. 10, the intermittent gear 36 of the cam gear means 34 is not engaged with the teeth region 40 because the terminal end 36b is disconnected from the second toothless portion 40b of the ring gear 39.

Meanwhile, the end-face cam portions 51a and 51b secured to the pendulum gear 43 are designed to take positions where they engage with the slopes of the protruded portions 50a and 50b formed on the arms 48a and 48b when the tetra arm mechanism 48 is urged by the tension coil spring 49, thereby forcibly rotating the pendulum gear 43 in the clockwise direction the same as during the loading operation.

Figure 11:
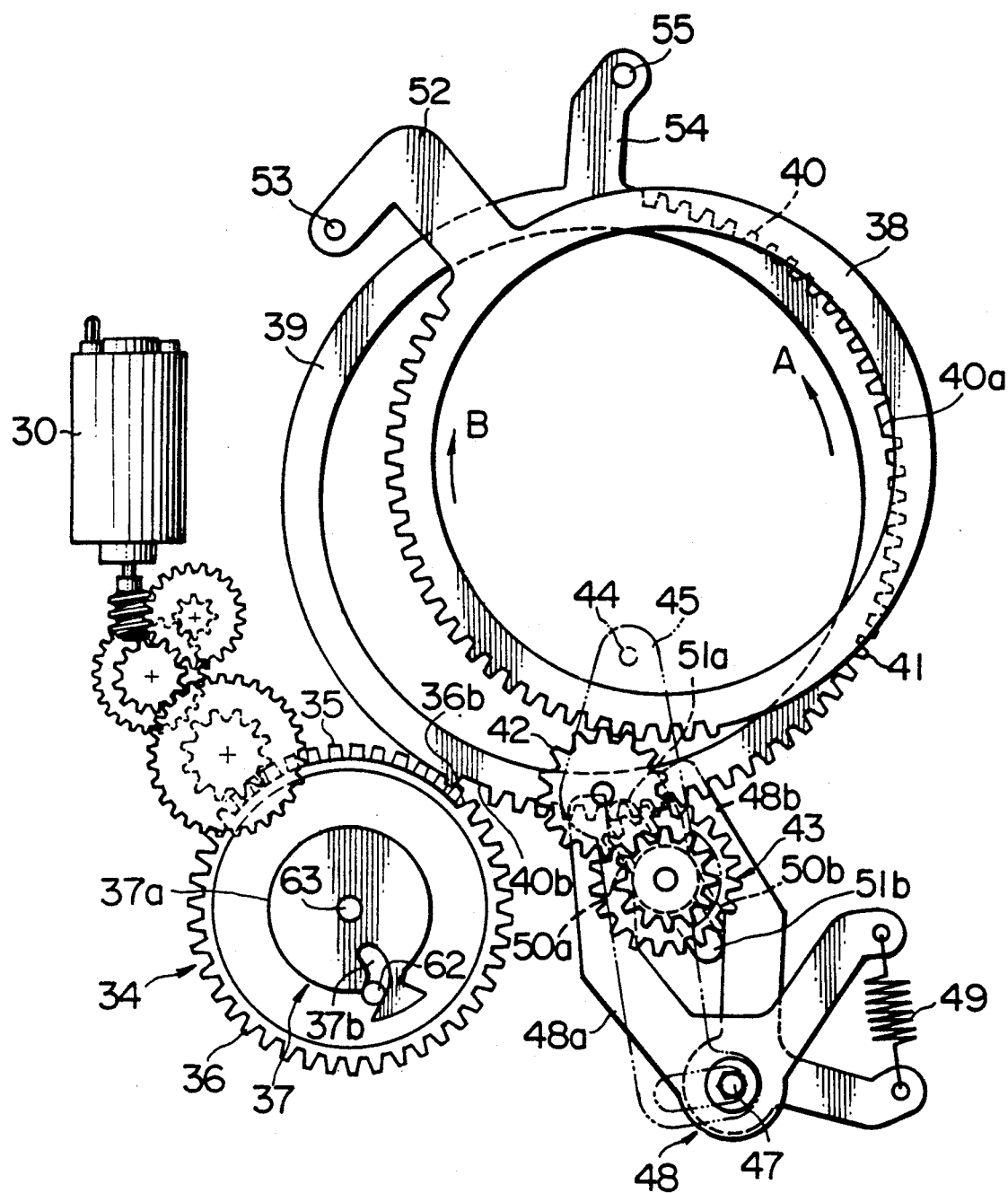

Thus, as indicated in FIG. 11, when the intermittent gear 3 is disconnected from the teeth region 40 of the ring gear 39, the tetra arm mechanism urged by the spring 49 further allows the pendulum gear 43 to rotate in the clockwise direction. The ring gears 38 and 39 further rotate in the directions of the arrows A, B, respectively. The boats 14 and 15 are each pressed against the stoppers 86 and 87 and the boats are fixed stationarily, thereby completing the loading operation.

When the timing of pressing the boat 14 against the stopper 86 does not coincide with the timing of pressing the boat 15 against the stopper 87, an adjustment is made by moving the pendulum gear 43 in any direction around the shaft 44.

Figure 12:
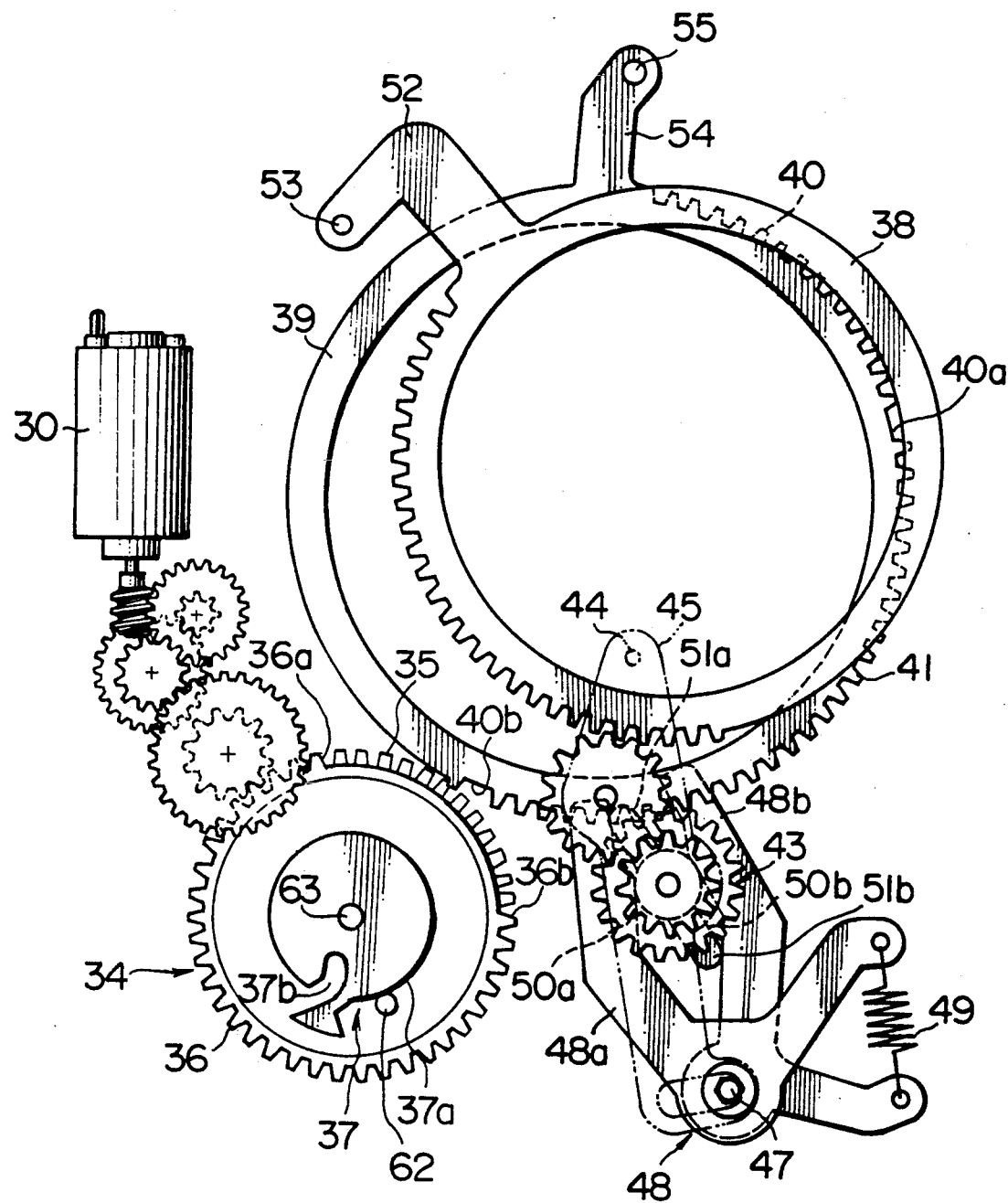

When the cam gear means 34 further rotates in the clockwise direction after completing the loading operation, as illustrated in FIGS. 2 and 12, the cam follower 62 provided on the lever 60 is fitted in the bent cam groove 37b of the cam 37 so as to pull the lever 60 in a direction of an arrow D. As a result, the plate 65 is rotated clockwise to push the lever 68 in a direction opposite to the arrow D. Then, the bell crank 72 is rotated in an anti-clockwise direction through the pin 70 by virtue of the tension coil spring 69 in order to press-contact the pinch roller 12 with the capstan 20.

Simultaneously, the arm 82 is pushed for rotating the arm 74 clockwise to interpose the auxiliary roller post 23 between the capstan 20 and the inclined post 24 via the arm 78 which is pivotally supported by the bearing 76 of the arm 74. At this time, the auxiliary roller post 23 is stably held and finishes the movement between the capstan 20 and the fixed inclined post 24 because the pin 80 provided on the arm 78 is guided within the groove 81 formed in the arm 82. Succeedingly, a gently sloped path of the magnetic tape 13 extending from the loading roller post 11 to the capstan 20 are favorably maintained.

Referring next to FIG. 12, the cam gear means 34 rotates in the anti-clockwise direction during the unloading operation to release the press-contacting movement of the pinch roller 12. When the cam gear means 34 rotates and arrives at the position of FIG. 10, the intermittent gear 36 of the cam gear means 34 engages with the teeth region 40 because the terminal portion 36b of the gear 37 is received in the second toothless region 40b of the ring gear 39. Thus, the ring gear 39 is rotatingly driven in a direction of an arrow E which is a rotating direction during the unloading operation. Further, the ring gear 38 is rotatingly driven in a direction of an arrow F which is a rotating direction during the unloading operation via the pendulum gear 43 and the intermediate gear 42.

At the time illustrated in FIG. 9 when the loading roller posts 8 and 10 and 11 are received in the recessed portions 5 and 6 of the tape cassette 2, respectively, the intermittent gear 36 of the cam gear means 34 becomes enabling to release from the teeth region 40 since the terminal portion 36a of the intermittent gear 36 is positioned in the first toothless region 40a of the ring gear 39. The end-face cam portions 51a and 51b secured to the pendulum gear 43 is designed such that the end-face cam portions are engaged with the slopes of the protruded portions 50a and 50b formed on the arms 48a and 48b when the tetra arm mechanism 48 is urged by the spring 49, thereby forcibly rotating the pendulum gear 43 in the anti-clockwise direction which is similar to the rotating direction of the pendulum gear during the unloading operation.

Figure 13:
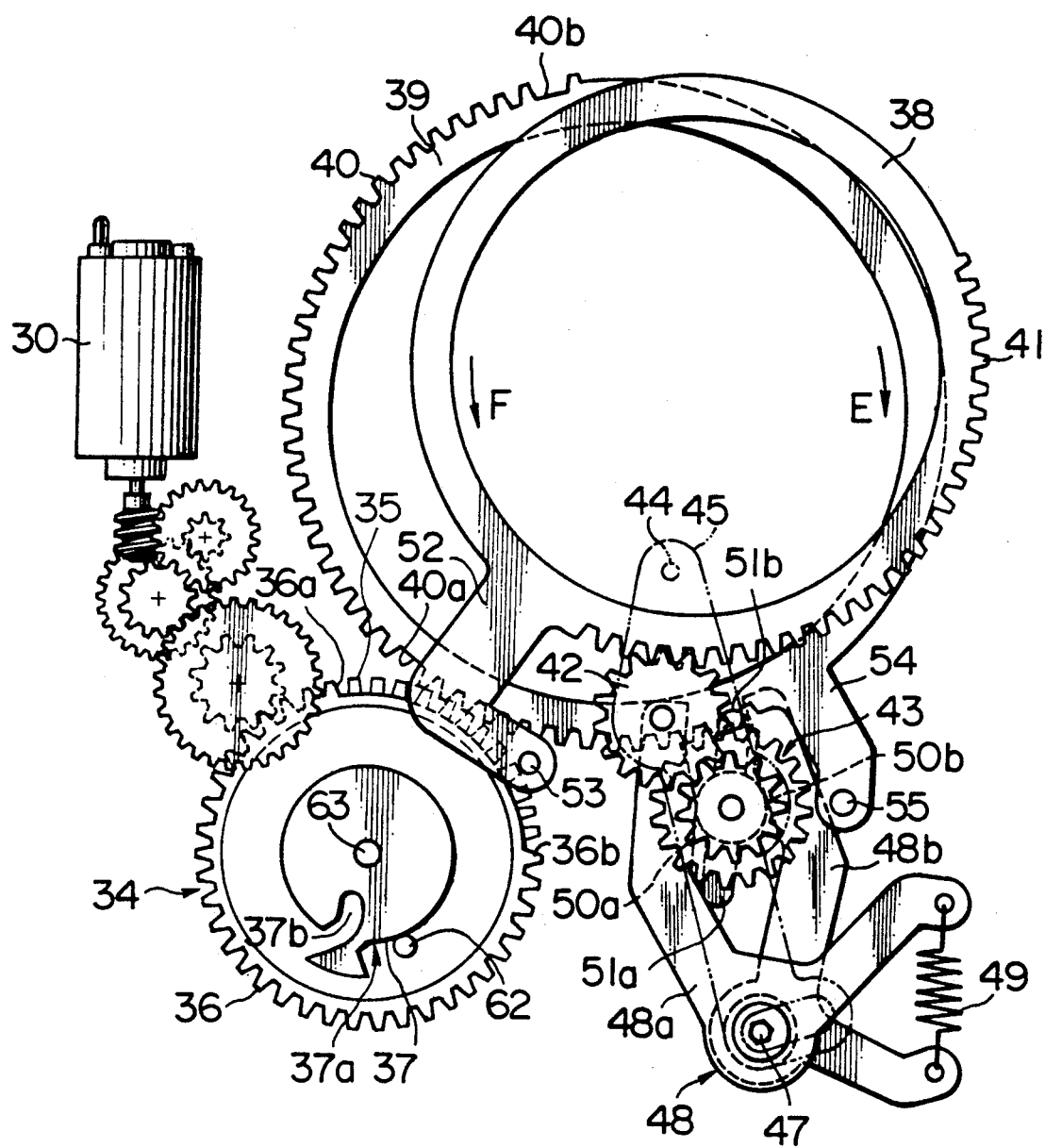

Thereafter, the cam gear means 34 further rotates in the anti-clockwise direction so that the intermittent gear 36 is moved apart from the teeth region 40 of the ring gear 39. As shown in FIG. 13, the pendulum gear 43 is further rotated in the anti-clockwise direction via the tetra arm mechanism 48 by the spring 49, whereby the ring gears 38 and 39 are further rotated in the directions of the arrows E and F, respectively. The boats 14 and 15 are pressed against the beginning ends of the loading guides 17 and 18 so that the positions of the boats are fixed at the unload positions. In this state, the tape cassette 2 is ejected, and the cam gear means 34 is then rotated clockwise to stop at the position of FIG. 9. Thus, the magnetic recording/playback apparatus returns to the initial state.

As set for so far, according to the invention, since the rotary head cylinder 19 is provided to extend substantially vertically, the running path of the magnetic tape 13 from the rotary head cylinder 19 to the capstan 20 can be inclined more moderately than that in the conventional art. The running path of the tape can be settled only by the roller posts. Accordingly, a tape tension in front of the capstan 20 is remarkably reduced, so that size and weight reduction of the capstan motor 25 can be realized. Further, because a pressing force for the pinch roller 12 can be decreased, it is possible to reduce the pinch roller 12 in size and also to miniaturize the pressing mechanism for the pinch roller and to reduce the thickness of the mechanism. The remarkable reduction of the tape tension and the decrease of the pressing force for the pinch roller 12 make it possible to minimize the tape running load and a damage the tape suffers from.

Also, according to the invention, because the ring gears 38 and 39 are located in such a manner that the center points of rotation thereof are deviated from each other, the rings can be retained more readily, as compared with the conventional structure in which ring gears having substantially same shapes are located generally concentrically. Further, the drive shafts 53 and 55 which are secured to the ring gears 38 and 39, can easily be operated corresponding to the loci of movement of the boats 14 and 15 guided along the loading guides 17 and 18. In addition, a relay linkage which is used in the conventional art is eliminated. Accordingly, the number of component parts can be reduced and an assembling efficiency of the apparatus can be improved, and furthermore, it becomes possible to realize a small-sized, light-weight, and thin magnetic recording/ playback apparatus.

Moreover, in accordance with the invention, the loading gear rotates one of the ring gears to thereby rotate the other one via the pendulum gear and the intermediate gear. For the purpose of biasing the loading post moving in cooperation with the other ring gear against the associated stopper, a distance between this associated stopper and the loading post moving in cooperation with the other ring gear is predetermined to be smaller than a distance between another stopper and the loading post moving in cooperation with the other ring gear driven by the loading gear. In this case, the loading post which moves in cooperation with the other ring gear is held by the stopper at first, before the loading post which moves in cooperation with the one ring gear driven by the loading gear is held by the stopper when the pendulum gear swings via the swinging plate. Thus, the positioning of the loading posts can be ensured after completing the loading operation.

The intermittent gear is used as the loading gear. The one ring gear driven by the intermittent gear is provided with the toothless region which enables the intermittent gear to mesh with and release from the above one ring gear. Further, the pendulum gear is provided with the end-face cam portions radially outwardly extending in the opposite directions. When the intermittent gear disconnects from the one ring gear, the end-face cam portions are pressed against the protruded portions of the tetra arm mechanism, thereby rotating the pendulum gear and further forcibly rotating the ring gear via the pendulum gear. In cooperation with the function of the swinging plate, even when the loading post moving in cooperation with any ring gear comes in contact with the stopper first, the loading posts can both be in press-contact with the stoppers. Accordingly, with the simplified gear mechanism in which two-staged gears with a spring are not employed, the press-contacting movement of the loading posts can be realized reliably by means of one urging means so that the present invention can provide a small-sized, light-weight and thin magnetic recording/playback apparatus.

What is claimed is:

1. A magnetic recording and/or reproducing apparatus comprising:
   a chassis base for receiving a tape cassette oriented parallel to the chassis base, said tape cassette containing a magnetic tape;
   a rotary magnetic head cylinder having an axis oriented generally perpendicular to the chassis base and near a position at which the tape cassette is to be located;
   a capstan drivable under contact with the magnetic tape to draw out the magnetic tape from the tape cassette; and
   a series of tape guide posts for use in drawing out the magnetic tape from the tape cassette, for winding the tape around part of a circumferential surface of said rotary magnetic head cylinder and for causing the tape to leave the rotary magnetic head cylinder and move toward said capstan so as to form a tape running path of the magnetic ape from a supply reel of the tape cassette to a take-up reel of the tape cassette,
   wherein:
   (a) the tape running path includes a supply-side path from the supply reel to the rotary magnetic head cylinder and a take-up side path from the rotary magnetic head cylinder to the take-up reel,
   (b) said series of tape guide posts comprises first and second perpendicular guide posts, perpendicular to a tape running plane defined as a plane perpendicular to the magnetic tape as it runs along said tape running path and parallel to a width-wise center line of the magnetic tape, by which the magnetic tape is drawn out from the tape cassette and wound around a part of a circumferential surface if the rotary magnetic head cylinder, and first and second inclined guide posts, which are not perpendicular to the tape running plane, arranged in the supply-side path and a third inclined guide post, which is not perpendicular to the tape running plane, arranged in the take-up side path,
   (c) the magnetic tape runs through the tape running path when the magnetic tape is being wound around the rotary magnetic head cylinder such that the magnetic tape is drawn out from the supply reel in a direction parallel to the chassis base and is wound partially around the first inclined guide post,
   (d) from the first inclined guide post the magnetic tape is elevated relatively from the chassis base toward the second inclined guide post so as to be wound partially around the second inclined guide post,
   (e) from the second inclined guide post the magnetic tape is moved toward the first perpendicular guide post so as to be wound partially around the first perpendicular guide post while said tape running plane is maintained without any change,
   (f) from the first perpendicular guide post the magnetic tape is moved toward the rotary magnetic head cylinder so as to be wound partially around the rotary magnetic head cylinder while said tape running plane is maintained without any change,
   (g) from the rotary magnetic head cylinder the magnetic tape is moved toward the second perpendicular guide post so as to be wound partially around the second perpendicular guide post while said tape running plane is maintained without any change,
   (h) from the second perpendicular guide post the magnetic tape proceeds toward the capstan so as to be brought into contact with the capstan while said tape running plane is maintained without any change,
   (i) from the capstan the magnetic tape is moved toward the third inclined guide post so as to be partially wound around the third inclined guide post, and
   (j) from the third inclined guide post the magnetic tape runs in a direction parallel to a phantom reference horizontal plane defined as a plane which extends through said width-wise center line at locations where the magnetic tape is to be wound around the supply reel and the take-up reel, is moved toward the take-up reel so as to be wound around the take-up reel and the tape running path is again parallel to said phantom reference horizontal plane.

2. A tape loading mechanism for a magnetic recording and/or reproducing apparatus, said mechanism comprising:
- a chassis base for receiving a tape cassette oriented parallel to the chassis base, said tape cassette containing a magnetic tape;
- a rotary head cylinder provided with a magnetic head for performing a recording and/or reproducing operation on the magnetic tape;
- a capstan for driving the magnetic tape;
- first and second guide posts for use in drawing out the magnetic tape from the tape cassette, winding the magnetic tape around a part of the circumferential surface of the rotary magnetic head cylinder and causing the magnetic tape to leave the rotary magnetic head cylinder and move toward the capstan so also to form a predetermined tape running path of the magnetic tape;
- first and second transferring members carrying the first and second guide posts, respectively;
- first and second loading rings arranged generally parallel to the chassis base and capable of being driven to rotate in reverse directions to each other;
- first and second guide members guiding the first and second transferring members, respectively, so that the first and second guide posts are moved from a position in the tape cassette to another position at which the tape running path is formed by means of the first and second guide posts; and
- first and second drive shafts fixedly mounted on the first and second loading rings, respectively, and inserted movably upward and downward in respective holes of the first and second transferring members with play, wherein:
- at least one of the first and second transferring members changes in perpendicular distance from the chassis base when it moves from a position in the tape cassette to said another position at which the tape running path is formed by means of the first and second guide posts,
- movement loci of the holes of the first and second transferring members coincide with movement loci of the first and second drive shafts, respectively, and
- the first and second loading rings rotate to drive the first and second transferring members.

* * * * *